(12) United States Patent
Shimizu et al.

(10) Patent No.: US 7,206,346 B2
(45) Date of Patent: Apr. 17, 2007

(54) MOTION VECTOR PREDICTIVE ENCODING METHOD, MOTION VECTOR DECODING METHOD, PREDICTIVE ENCODING APPARATUS AND DECODING APPARATUS, AND STORAGE MEDIA STORING MOTION VECTOR PREDICTIVE ENCODING AND DECODING PROGRAMS

(75) Inventors: Atsushi Shimizu, Tokyo (JP); Hirohisa Jozawa, Tokyo (JP); Kazuto Kamikura, Tokyo (JP); Hiroshi Watanabe, Tokyo (JP); Atsushi Sagata, Tokyo (JP); Seishi Takamura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 875 days.

(21) Appl. No.: 10/354,663

(22) Filed: Jan. 30, 2003

(65) Prior Publication Data

US 2003/0174776 A1    Sep. 18, 2003

Related U.S. Application Data

(63) Continuation of application No. 09/254,116, filed on Feb. 25, 1999, now abandoned.

(51) Int. Cl.
*H04N 7/12* (2006.01)
*H04B 1/66* (2006.01)
(52) U.S. Cl. ............................................. 375/240.17
(58) Field of Classification Search ................. None
See application file for complete search history.

(56) References Cited

U.S. PATENT DOCUMENTS 4,999,705 A    3/1991    Puri (Continued)

FOREIGN PATENT DOCUMENTS

EP    0 419 752 A1    4/1991
EP    0 538 667 A2    4/1993

OTHER PUBLICATIONS

"Information technology—Coding of moving pictures and associated audio for digital storage media at up to about 1,5 Mbit/s, Part 2: Video," ISO/IEC 11172-2: 1993(E).

(Continued)

*Primary Examiner*—Nhon Diep
(74) *Attorney, Agent, or Firm*—Jones Day

(57) ABSTRACT

A motion vector predictive encoding method, a motion vector decoding method, a predictive encoding apparatus, a decoding apparatuses, and storage media storing motion vector predictive encoding and decoding programs are provided, thereby reducing the amount of generated code with respect to the motion vector, and improving the efficiency of the motion-vector prediction. If the motion-compensating mode of the target small block to be encoded is the global motion compensation, the encoding mode of an already-encoded small block is the interframe coding mode, and the motion-compensating mode of the already-encoded small block is the global motion compensation, then the motion vector of the translational motion model is determined for each pixel of the already-encoded small block, based on the global motion vector (steps S1–S5). Next, the representative motion vector is calculated as the predicted vector, based on the motion vector of each pixel of the already-encoded small block (step S6). Finally, the prediction error is calculated for each component of the motion vector and each prediction error is encoded (steps S7 and S8).

12 Claims, 11 Drawing Sheets

U.S. PATENT DOCUMENTS

| | | | |
|---|---|---|---|
| 5,262,854 | A | 11/1993 | Ng |
| 5,424,779 | A | 6/1995 | Odaka et al. |
| 5,430,480 | A * | 7/1995 | Allen et al. ............. 348/208.4 |
| 5,657,087 | A | 8/1997 | Jeong et al. |
| 5,764,803 | A | 6/1998 | Jacquin et al. |
| 5,784,115 | A | 7/1998 | Bozdagi |
| 5,912,991 | A | 6/1999 | Jeon et al. |
| 6,008,852 | A | 12/1999 | Nakaya |
| 6,084,912 | A | 7/2000 | Reitmeier et al. |

OTHER PUBLICATIONS

Ad hoc Group on MPEG-4 Video VM editing, "MPEG-4 Video Verification Model Version 7.0," Coding of Moving Picture and Associated Audio Information, ISO/IECJTCI/SC29/WG11 (Apr. 1997).

Hoetter, "Differential Estimation of the Global Motion Parameters Zoon and Pan," 8242 Signal Processing No. 3, Amsterdam, NL (Mar. 1989).

Lee, et al., "A Selective Coding Method Based on Global/Local Motion Information," Signal Processing 0165-1684/96 (1996).

Moscheni et al., "A New Two-Stage Global/Local Motion Estimation Based on a Background/Foreground Segmentation," IEEE 0-7803-2431-5/95 (1995).

Tse et al., "Global Zoom/Pan Estimation and Compensation for Video Compression," IEEE, CH2977 7/91/0000-2725 (1991).

Yoo et al., "An Efficient Coding Method For the Local Motion Vector by Using Global Motion," IEEE Transactions on Consumer Electronics, vol. 44, No. 2 (May 1998).

* cited by examiner

FIG. 9
(Prior Art)
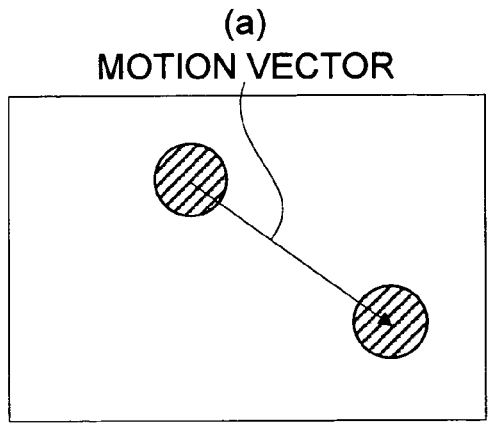
(a)
MOTION VECTOR
TRANSLATIONAL MOTION MODEL
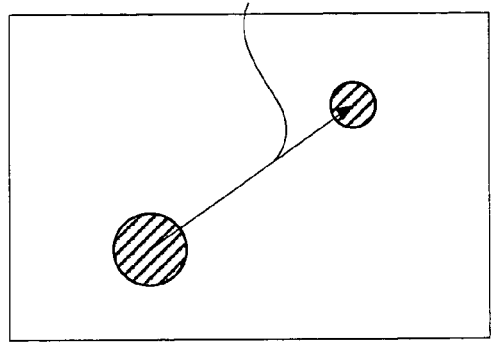
(b)
MOTION VECTOR
TRANSLATIONAL MOTION AND EXTENDING/CONTRACTING MOTION MODEL
FIG. 10
(Prior Art)
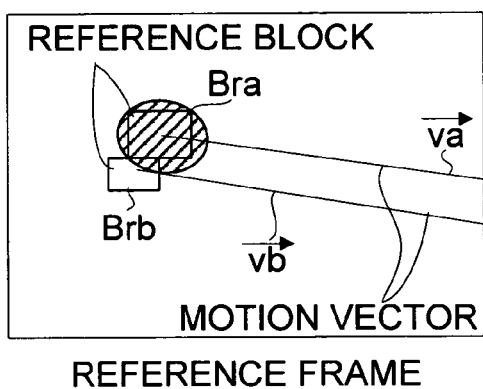
REFERENCE FRAME
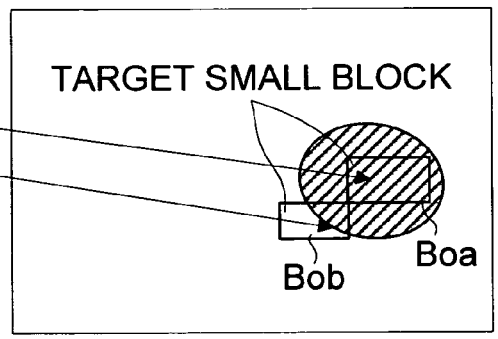
TARGET FRAME
FIG. 13
(Prior Art)
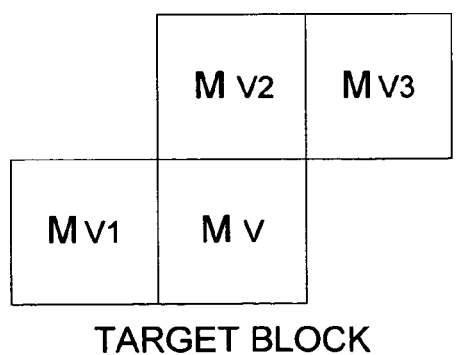
TARGET BLOCK

MOTION VECTOR PREDICTIVE ENCODING METHOD, MOTION VECTOR DECODING METHOD, PREDICTIVE ENCODING APPARATUS AND DECODING APPARATUS, AND STORAGE MEDIA STORING MOTION VECTOR PREDICTIVE ENCODING AND DECODING PROGRAMS

This is a continuation of application Ser. No. 09/254,116, filed Feb. 25, 1999 now abandoned.

TECHNICAL FIELD

The present invention relates to motion vector predictive encoding and decoding methods, predictive encoding and decoding apparatuses, and storage media storing motion vector predictive encoding and decoding programs. These methods, apparatuses, and storage media are used for motion-compensating interframe prediction for motion picture encoding.

BACKGROUND ART

The interframe predictive coding method for coding motion pictures (i.e., video data) is known, in which an already-encoded frame is used as a prediction signal so as to reduce temporal redundancy. In order to improve the efficiency of the time-based prediction, a motion-compensating interframe prediction method is used in which a motion-compensated picture signal is used as a prediction signal. The number and the kinds of components of the motion vector used for the motion compensation are determined depending on the assumed motion model used as a basis. For example, in a motion model in which only translational movement is considered, the motion vector consists of components corresponding to horizontal and vertical motions. In another motion model in which extension and contraction are also considered in addition to the translational movement, the motion vector consists of components corresponding to horizontal and vertical motions, and a component corresponding to the extending or contracting motion.

Generally, the motion compensation is executed for each small area obtained by dividing a picture into a plurality of areas such as small blocks, and each divided area has an individual motion vector. It is known that the motion vectors belonging to neighboring areas including adjacent small areas have a higher correlation. Therefore, in practice, the motion vector of an area to be encoded is predicted based on the motion vector of an area which neighbors the area to be encoded, and a prediction error generated at the prediction is variable-length-encoded so as to reduce the redundancy of the motion vector.

In the moving-picture coding method ISO/IEC 11172-2 (MPEG-1), the picture to be encoded is divided into small blocks so as to motion-compensate each small block, and the motion vector of a small block to be encoded (hereinbelow, called the "target small block") is predicted based on the motion vector of a small block which has already been encoded.

In the above MPEG-1, only translational motions can be compensated. It may be impossible to compensate more complicated motions with a simpler model, such as MPEG-1, which has few components of the motion vector. Accordingly, the efficiency of the interframe prediction can be improved by using a motion-compensating method which corresponds to a more complicated model having a greater number of components of the motion vector. However, when each small block is motion-compensated in such a method for a complicated motion model, the amount of codes generated when encoding the relevant motion vector is increased.

An encoding method for avoiding such an increase of the amount of generated codes is known, in which the motion-vector encoding is performed using a method, selected from a plurality of motion-compensating methods, which minimizes the prediction error with respect to the target block. The following is an example of such an encoding method in which two motion-compensating methods are provided, one method corresponding to a translational motion model, the other corresponding to a translational motion and extending/contracting motion model, and one of the two motion-compensating methods is chosen.

FIG. 9 shows a translational motion model (see part (a)) and a translational motion and extending/contracting motion model (see part (b)). In the translational motion model of part (a), the motion of a target object is represented using a translational motion component (x, y). In the translational motion and extending/contracting motion model of part (b), the motion of a target object is represented using a component (x, y, z) in which parameter Z for indicating the amount of extension or contraction of the target object is added to the translational motion component (x, y). In the example shown in FIG. 9, parameter Z has a value corresponding to the contraction (see part (b)).

Accordingly, motion vector $$\vec{v1}$$

of the translational motion model is represented by:

$$\vec{v1} = (x, y)$$

while motion vector $$\vec{v2}$$

of the translational motion and extending/contracting motion model is represented by:

$$\vec{v2} = (x, y, z)$$

In the above formulas, x, y, and z respectively indicate horizontal, vertical, and extending/contracting direction components. Here, the unit for motion compensation is a small block, the active motion-compensating method may be switched for each small block in accordance with the present prediction efficiency, and the motion vector is predicted based on the motion vector of an already-encoded small block.

If the motion-compensating method chosen for the target small block is the same as that adopted for the already-encoded small block, the prediction error of the motion vector is calculated by the following equations.

For the translational motion model:

$$d1x,y = v1x,y(i) - v1\ x,y(i-1) \quad (1)$$

For the translational motion and extending/contracting motion model:

$$d2x,y,z = v2x,y,z(i) - v2x,y,z(i-1) \quad (2)$$

Here, v1x,y(i) and v2x,y,z(i) mean components of the motion vector of the target small block, while v1x,y(i−1) and v2x,y,z(i−1) mean components of the motion vector of a small block of the previous frame.

As explained above, prediction errors d x,y and d x,y,z are calculated and encoded so as to transmit the encoded data to the decoding side. Even if the size of each small block is not the same in the motion-compensating method, the motion vector predictive encoding is similarly performed if the motion model is the same.

If the motion-compensating method chosen for the target small block differs from that adopted for the already-encoded small block, or if intraframe coding is performed, then the predicted value for each component is set to 0 and the original values of each component of the target small block are transmitted to the decoding side.

By using such an encoding method, the redundancy of the motion vector with respect to the motion-compensating interframe predictive encoding can be reduced and the amount of generated codes of the motion vector can be reduced.

On the other hand, the motion vector which has been encoded using the above-described encoding method is decoded in a manner such that the prediction error is extracted from the encoded data sequence, and the motion vector of the small block to be decoded (i.e., the target small block) is decoded by adding the prediction error to the motion vector which has already been decoded. See the following equations.

For the translational motion model:

$$v1x,y(i) = v1x,y(i-1) + d1x,y \quad (3)$$

For the translational motion and extending/contracting motion model:

$$v2x,y,z(i) = v2x,y,z(i-1) + d2x,y,z \quad (4)$$

Here, v1x,y(i) and v2x,y,z(i) mean components of the motion vector of the target small block, while v1x,y(i−1) and v2x,y,z(i−1) mean components of the already-decoded motion vector.

In the model ISO/IEC 14496-2 (MPEG-4) under testing for international standardization in January, 1999, a similar motion-compensating method is adopted. The MPEG-4 adopts a global motion-compensating method for predicting the general change or movement of a picture caused by panning, tilting and zooming operations of the camera (refer to "MPEG-4 Video Verification Model Version 7.0", ISO/IEC JTC1/SC29/WG11N1682, MPEG Video Group, April, 1997). Hereinafter, the structure and the operational flow of the encoder using the global motion compensation will be explained with reference to FIG. 11.

First, a picture to be encoded (i.e., target picture) 31 is input into global motion detector 34 so as to determine global motion parameters 35 with respect to the entire picture. In the MPEG-4, the projective transformation and the affine transformation may be used in the motion model.

With a target point (x,y) and a corresponding point (x',y') relating to the transformation, the projective transformation can be represented using the following equations (5) and (6).

$$x' = (ax + by + tx)/(px + qy + s) \quad (5)$$

$$y' = (cx + dy + ty)/(px + qy + s) \quad (6)$$

Generally, the case of "s=1" belongs to the projective transformation. The projective transformation is a general representation of the two dimensional transformation, and the affine transformation is represented by the following equations (7) and (8), which can be obtained under conditions of "p=Q=0" and "s=1".

$$x' = ax + by + tx \quad (7)$$

$$y' = cx + dy + ty \quad (8)$$

In the above equations, "tx" and "ty" respectively represent the amounts of translational motions in the horizontal and vertical directions. Parameter "a" represents extension/contraction or inversion in the horizontal direction, while parameter "b" represents extension/contraction or inversion in the vertical direction. Parameter "b" represents shear in the horizontal direction, while parameter "c" represents shear in the vertical direction. In addition, the conditions of "a=cos θ, b=sin θ, c=−sin θ, and d=cos θ" correspond to rotation of angle θ. The conditions of "a=d=1" and "b=c=0" equal the conventional translational motion model.

As explained above, the affine transformation used as the motion model enables the representation of various motions such as translational movement, extension/contraction, reverse, shear, and rotation, and any combination of these motions. A projective transformation having eight or nine parameters can represent more complicated motions or deformations.

The global motion parameters 35, determined by the global motion detector 34, and reference picture 33 stored in the frame memory 32 are input into global motion compensator 36. The global motion compensator 36 generates a global motion-compensating predicted picture 37 by making the motion vector of each pixel, determined based on the global motion parameters 35, act on the reference picture 33.

The reference picture 33 stored in the frame memory 32, and the input picture 31 are input into local motion detector 38. The local motion detector 38 detects, for each macro block (16 pixels×16 lines), motion vector 39 between input picture 31 and reference picture 33. The local motion compensator 40 generates a local motion-compensating predicted picture 41 based on the motion vector 39 of each macro block and the reference picture 33. This method equals the conventional motion-compensating method used in the conventional MPEG or the like.

Next, one of the global motion-compensating predicted picture 37 and the local motion-compensating predicted picture 41, whichever has the smaller error with respect to the input picture 31, is chosen in the encoding mode selector 42 for each macro block. This choice is performed for each macro block. If the global motion compensation is chosen, the local motion compensation is not performed in the relevant macro block; thus, motion vector 39 is not encoded. The predicted picture 43 chosen via the encoding mode selector 42 is input into subtracter 44, and picture 45 corresponding to the difference between the input picture 31 and the predicted picture 43 is converted into DCT (discrete cosine transformation) coefficient 47 by DCT section 46. The DCT coefficient 47 is then converted into quantized index 49 in quantizer 48. The quantized index 49 is encoded by quantized-index encoder 57, encoded-mode choice information 56 is encoded by encoded-mode encoder 58, motion vector 39 is encoded by motion-vector encoder 59, and the global motion parameters 35 are encoded by global-motion-parameter encoder 60. These encoded data are multiplexed and output as an encoder output.

In order for the encoder to also acquire the same decoded picture as acquired in the decoder, the quantized index 49 is inverse-converted into a quantization representative value 51 by inverse quantizer 50, and is further inverse-converted into difference picture 53 by inverse-DCT section 52. The difference picture 53 and predicted picture 43 are added to each other by adder 54 so that local decoded picture 55 is generated. This local decoded picture 55 is stored in the frame memory 32 and is used as a reference picture at the encoding of the next frame.

Next, relevant decoding operations of the MPEG-4 decoder will be explained with reference to FIG. 12. The multiplexed and encoded bit stream is divided into each element, and the elements are respectively decoded. The quantized-index decoder 61 decodes quantized index 49, encoded-mode decoder 62 decodes encoded-mode choice information 56, motion-vector decoder 63 decodes motion vector 39, and global-motion-parameter decoder 64 decodes global motion parameters 35.

The reference picture 33 stored in the frame memory 68 and global motion parameters 35 are input into global motion compensator 69 so that global motion-compensated picture 37 is generated. In addition, the reference picture 33 and motion vector 39 are input into local motion compensator 70 so that local motion-compensating predicted picture 41 is generated. The encoded-mode choice information 56 activates switch 71 so that one of the global motion-compensated picture 37 and the local motion-compensated picture 41 is output as predicted picture 43.

The quantized index 49 is inverse-converted into quantization representative value 51 by inverse-quantizer 65, and is further inverse-converted into difference picture 53 by inverse-DCT section 66. The difference picture 53 and predicted picture 43 are added to each other by adder 67 so that local decoded picture 55 is generated. This local decoded picture 55 is stored in the frame memory 68 and is used as a reference picture when encoding the next frame.

In the above-explained global motion-compensating predictive method adopted in MPEG-4, one of the predicted pictures of the global motion compensation and the local motion compensation, whichever has the smaller error, is chosen for each macro block so that the prediction efficiency of the entire frame is improved. In addition, the motion vector is not encoded in the macro block to which the global motion compensation is adopted; thus, the generated codes can be reduced by the amount necessary for conventional encoding of the motion vector.

On the other hand, in the conventional method in which the active motion-compensating method is switched between a plurality of motion-compensating methods corresponding to different motion models, no prediction relating to a shift between motion vectors belonging to different motion models is performed. For example, in the encoding method in which the motion-compensating method corresponding to a translational motion model and the motion-compensating method corresponding to a translational motion and extending/contracting motion model are switched, a shift from the motion vector of the translational motion and extending/contracting motion model to the motion vector of the translational motion model cannot be simply predicted using a difference, because the number of used parameters with respect to the motion vector is different between the two methods.

However, redundancy of the motion vector may also occur between different motion models. Therefore, correlation between the motion vector of the translational motion model and the motion vector of the translational motion and extending/contracting motion model will be examined with reference to motion vectors shown in FIG. 10. In FIG. 10, it is assumed that in the motion compensation of target small blocks Boa and Bob, the target small block Boa is motion-compensated using the method corresponding to the translational motion model and referring to small block Bra included in the reference frame, while the target small block Bob is motion-compensated using the method corresponding to the translational motion and extending/contracting motion model and referring to small block Brb included in the reference frame.

In this case, motion vector $\vec{va}=(xa, ya)$ in FIG. 10 indicates the translational motion model, while motion vector $\vec{vb}=(xb, yb, zb)$ in FIG. 10 indicates the translational motion and extending/contracting motion model. Here, in the motion compensation of the small block Bob, small block Brb in the reference frame to be referred to is extended. Therefore, the translational motion components of the motion vector va and vb in FIG. 10 have almost the same values and redundancy exists.

However, in the conventional method, such redundancy between motion vectors of different motion models cannot be reduced because no motion vector of a motion model which differs from the present motion model is predicted based on the motion vector of the present model.

In the above MPEG-4, predictive encoding is adopted so as to efficiently encode the motion vector. For example, the operations of motion-vector encoder 59 in FIG. 11 are as follows. As shown in FIG. 13, three motion vectors such as motion vector MV1 of the left block, motion vector MV2 of the block immediately above, and motion vector MV3 of the block diagonally above to the right are referred to so as to obtain a median thereof as a predicted value of the motion vector MV of the present block. The predicted value PMV of the vector MV of the present block is defined using the following equation (9).

$$PMV=median (MV1, MV2, MV3) \qquad (9)$$

If the reference block corresponds to the intraframe-coding mode, no motion vector exists. Therefore, the median is calculated with vector value 0 at the relevant position. If the reference block has been predicted using the global motion compensation, no motion vector exists. Therefore, the median is calculated with vector value 0 at the relevant position also in this case. For example, if the left block was predicted using the local motion compensation, the block immediately above was predicted using the global motion compensation, and the block diagonally above to the right was encoded using the intraframe coding method, then MV2=MV3=0. In addition, if the three reference blocks were all predicted using the global motion compensation, then MV1=MV2=MV3=0. In this case, the median is also 0 and thus the predicted value is 0. Therefore, this case is equal to the case that the motion vector of the target block is not subjected to predictive encoding, and the encoding efficiency is degraded.

In the MPEG-4, the following seven kinds of ranges (see List 1) are defined with respect to the size of the local motion vector, and the used range is communicated to the decoder by using a codeword "fcode" included in the bit stream.

List 1

| fcode | Range of motion vector | | | |
|---|---|---|---|---|
| 1 | −16 | to | +15.5 | pixels |
| 2 | −32 | to | +31.5 | pixels |
| 3 | −64 | to | +63.5 | pixels |
| 4 | −128 | to | +127.5 | pixels |
| 5 | −256 | to | +255.5 | pixels |
| 6 | −512 | to | +511.5 | pixels |
| 7 | −1024 | to | +1023.5 | pixels |

The global motion parameters used in MPEG-4 may have a wide range of −2048 to +2047.5; thus, the motion vector determined based on the global motion vector may have a value from −2048 to +2047.5. However, the range of the local motion vector is smaller than the above range and the prediction may have a large error. For example, if fcode=3; the motion vector of the target block (Vx, Vy)=(+48, +36.5); the predicted vector determined based on the global motion vector (PVx, PVy)=(+102, +75), then the prediction error (MVDx, MVDy)=(−54, −38.5). The absolute values of this error are thus larger than the above values of the motion vector (Vx, Vy). The smaller the absolute values of the prediction error (MVDx, MVDy), the shorter the length of the codeword assigned to the prediction error. Therefore, there is a disadvantage in that the amount of code are increased due to the prediction of the motion vector.

Therefore, the objective of the present invention is to provide a motion vector predictive encoding method, a motion vector decoding method, a predictive encoding apparatus, a decoding apparatuses, and computer-readable storage media storing motion vector predictive encoding and decoding programs, which reduce the amount of generated code with respect to the motion vector, and improve the efficiency of the motion-vector prediction.

DISCLOSURE OF INVENTION

The motion vector predictive encoding method, predictive encoding apparatus, and motion vector predictive encoding program stored in a computer-readable storage medium according to the present invention relate to a motion vector predictive encoding method in which a target frame to be encoded is divided into small blocks and a motion-compensating method to be applied to each target small block to be encoded is selectable from among a plurality of motion-compensating methods. In the present invention, when the motion vector of the target small block is predicted based on the motion vector of an already-encoded small block, if the motion model of the motion vector of the target small block differs from the motion model of the motion vector of the already-encoded small block, then the motion vector of the target small block is predicted by converting the motion vector of the already-encoded small block for the prediction into one suitable for the motion model of the motion vector used in the motion-compensating method of the target small block and by calculating a predicted vector, and a prediction error of the motion vector is encoded.

In the decoding method, decoding apparatus, and decoding program stored in a computer-readable storage medium for decoding the motion vector encoded using the above motion vector predictive encoding method, if the motion model of the motion vector of a target small block to be decoded differs from the motion model of the motion vector of the already-decoded small block, then the motion vector of the already-decoded small block is converted into one suitable for the motion model of the motion vector used in the motion-compensating method of the target small block, and a predicted vector is calculated based on the converted motion vector of the already-decoded small block, and the motion vector is decoded by adding the prediction error to the predicted vector.

There are two types of motion-compensating method, i.e., global motion compensation (for compensating a global motion over a plurality of areas) and local motion compensation (for compensating a local motion for each area), as described above. In the global motion compensation, the motion vector representing a global motion over a plurality of areas is transmitted, while in the local motion compensation, the motion vector for each area is transmitted.

The present invention provides another motion vector predictive encoding method, predictive encoding apparatus, and motion vector predictive encoding program stored in a computer-readable storage medium. This case relates to a motion vector predictive encoding method in which a global motion-compensating method and a local motion-compensating method are switchable for each target small block to be encoded, wherein when the motion vector of the target small block is predicted based on the motion vector of an already-encoded small block, and if the motion-compensating method of the target small block differs from the motion-compensating method of the already-encoded small block, then a predicted vector is calculated by converting the format of the motion vector of the already-encoded small block for the prediction into a format of the motion vector used in the motion-compensating method of the target small block, and the motion vector of the target small block is predicted and a prediction error of the motion vector is encoded.

In the encoding of the motion vector using the above motion vector predictive encoding method, predictive encoding apparatus, and motion vector predictive encoding program stored in a computer-readable storage medium, if the motion-compensating method used for the target small block is the local motion-compensating method and the motion-compensating method used for the already-encoded small block for the prediction is the global motion-compensating method, then a local motion vector of the already-encoded small block is calculated based on the global motion vector, the motion vector of the target small block is predicted, and the prediction error of the motion vector is encoded.

When the motion vector of the target small block for which the local motion compensation is chosen is predicted based on the global motion parameters, if the value of the predicted vector is not within a predetermined range, the predicted vector is clipped to have a value within the predetermined range. On the other hand, when the motion vector of the block for which the local motion compensation is chosen is predicted based on the global motion parameters, if the value of the predicted vector is not within a predetermined range, the value of the predicted vector is set to 0.

In the decoding method, decoding apparatus, and decoding program stored in a computer-readable storage medium for decoding the motion vector encoded using the above-mentioned motion vector predictive encoding methods, predictive encoding apparatuses, and motion vector predictive encoding programs stored in computer-readable storage media, if the motion-compensating method of the target small block to be decoded differs from the motion-compensating method of the already-decoded small block, then the format of the motion vector of the already-decoded small block is converted into a format of the motion vector used in the motion-compensating method of the target small block, and a predicted vector of the motion vector of the target small block is calculated, and the motion vector is decoded by adding the prediction error to the predicted vector.

In addition, if the motion-compensating method used for the target small block to be decoded is the local motion-compensating method and the motion-compensating method used for the already-decoded small block for the prediction is the global motion-compensating method, then a local motion vector of the already-decoded small block is calculated based on the global motion vector, a predicted vector with respect to the motion vector of the target small block is calculated, and the motion vector is decoded by adding the prediction error to the predicted vector.

In the above motion vector encoding and decoding methods, predictive encoding apparatus, decoding apparatus, motion vector predictive encoding program, and decoding program, when the motion vector of the small block in any motion model is converted into a motion vector in a translational motion model, a representative motion vector of the small block is calculated based on the motion vector in the translational motion model determined for each pixel in the small block.

In the calculation of the representative motion vector, each component of the representative motion vector is set to a statistic (one of the average, intermediate value, median, mode, maximum value, and minimum value).

When decoding, if the predicted value of the local motion vector which is calculated based on the global motion parameters is not within a predetermined range, the predicted vector is clipped to have a value within the predetermined range. Instead, if the predicted value of the local motion vector which is calculated based on the global motion parameters is not within a predetermined range, the value of the predicted vector is set to 0.

According to the motion vector predictive encoding method, decoding method, predictive encoding apparatus, decoding apparatus, motion vector predictive encoding program, and decoding program of the present invention, the motion vector can be predicted between motion vectors of different motion models, and also between motion vectors of the global motion compensation and the local motion compensation. Therefore, the amount of generated code with respect to the motion vector can be reduced.

In addition, if the predicted vector determined based on the global motion parameters is not within the range of the local motion vector, the predicted vector can be clipped to have the maximum value or the minimum value of the range. Therefore, if "fcode=3" (the motion vector range is from −64 to +63.5 pixels), the motion vector of the present block: $(V_x, V_y)=(+48, +36.5)$, and the predicted vector calculated based on the global motion parameters: $(PVx, PVy)=(+102, +75)$, then the predicted vector $(PVx, PVy)$ is clipped to "(+63.5, +63.5)". Accordingly, the prediction error $(MVD_x, MVD_y)$ is "(−15.5, −27)" and the absolute values thereof are smaller than those obtained by the above-mentioned conventional method in which the prediction error is "(−54, −38.5)". The smaller the absolute values of the prediction error, the shorter the length of the codeword assigned to a difference between two motion vectors; thus, the total amount of code can be reduced.

In the method of setting the value of the predicted vector to 0, if "fcode=3" (the motion vector range is from −64 to +63.5 pixels), the motion vector of the present block: $(V_x, V_y)=(+48, +36.5)$, and the predicted vector calculated based on the global motion parameters: $(PVx, PVy)=(+102, +75)$, then the predicted vector $(PVx, PVy)$ is set to "(0, 0)". Accordingly, the prediction error $(MVD_x, MVD_y)$ is "(+48, +36.5)" and the absolute values thereof are larger than those obtained by the above clipping method in which the prediction error is "(−15.5, −27)", but smaller than those obtained by the above-mentioned conventional method in which the prediction error is "(−54, −38.5)".

The following is another example, in which "fcode=1" (the motion vector range is from −16 to +15.5 pixels), the motion vector of the present block: $(V_x, V_y)=(+3, +1.5)$, and the predicted vector calculated based on the global motion parameters: $(PVx, PVy)=(+102, +75)$. In the clipping method, the predicted vector $(PVx, PVy)$ is "(+15.5, +15.5)" and the prediction error $(MVD_x, MVD_y)$ is "(−12.5, −14)". In the "0" setting method, the predicted vector $(PVx, PVy)$ is "(0, 0)" and the prediction error $(MVD_x, MVD_y)$ is "(+3, +1.5)". Therefore, in this example, the absolute values in the "0" setting method can be smaller than those in the clipping method.

BRIEF DESCRIPTION OF THE DRAWINGS

FIG. 9 is a diagram showing examples of the motion model, part (a) showing a translational motion model and part (b) showing a translational motion and extending/contracting motion model.

FIG. 10 is a diagram showing motion vectors of the motion model.

FIG. 13 is a diagram showing the arrangement of reference blocks in the motion vector prediction of the MPEG-4.

MODES FOR CARRYING OUT THE INVENTION

Hereinbelow, embodiments according to the present invention will be explained with reference to the drawings. In the embodiments, the global motion-compensating method (GMC) and the local motion-compensating method (LMC) are switchable for each small block. The motion model used in the GMC is determined in consideration of translational movement and extension/contraction, while the motion model used in the LMC is a translational motion model.

In the GMC, the motion vector is not assigned to each small block. Therefore, prediction is performed with respect to a motion vector used for the local motion compensation. At the time of predicting the motion vector, the format of the motion vector is converted into that of the translational motion model. When the motion vector of the global motion compensation is converted into the motion vector of the translational motion model, a representative vector of the small block is calculated. In the calculation, the average of the motion vectors which were calculated for each pixel of the small block is determined as the representative vector. The size of each small block is M×N pixels.

First Embodiment (1) Motion Vector Predictive Encoding Method and Motion Vector Decoding Method Hereinbelow, the motion vector predictive encoding method and motion vector decoding method of the first embodiment according to the present invention will be explained with reference to flowcharts in FIGS. 1 and 2.

(1-1) Motion Vector Predictive Encoding Method

Figure 1:
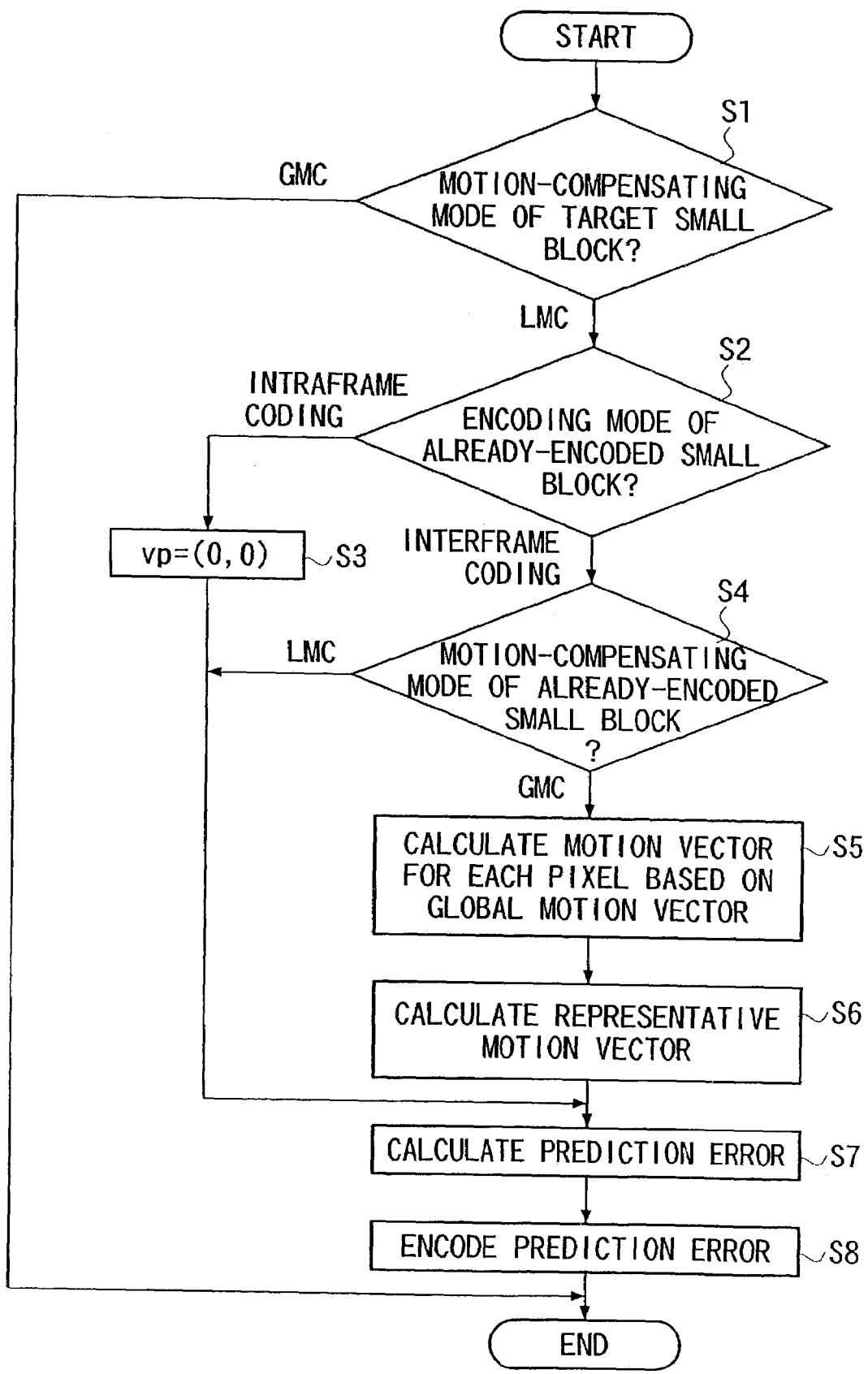
FIG. 1 is a flowchart showing the operations of the motion vector predictive encoding method of the first embodiment according to the present invention.

In the first step S1 in FIG. 1, the motion-compensating mode of the target small block is determined. If the mode corresponds to the GMC, then the predictive encoding of the motion vector is not executed and the operation of the motion-vector encoding is terminated.

If the mode corresponds to the LMC in step S1, then the operation shifts to step S2, where the encoding mode of a small block which was already encoded is determined. If it is determined that the encoding mode is the intraframe coding mode, then the operation shifts to step S3. In step S3, the predicted vector vp is set to 0 (that is, vp=(0, 0)), and then the operation shifts to step 7 (explained later).

If it is determined that the encoding mode is the interframe coding mode in step S2, then the operation shifts to step S4 where the motion-compensating mode of the already-encoded small block is determined. If it is determined that the motion-compensating mode corresponds to the LMC, then the motion vector of the small block $v_{i-1}=(x_{i-1}, y_{i-1})$ is determined as the predicted vector vp and the operation shifts to step S7.

If it is determined that the motion-compensating mode corresponds to the GMC in step S4, then the operation shifts to step S5, where the motion vector of the translational motion model, that is, $v_{i-1}(m,n)=(x_{i-1}(m,n), y_{i-1}(m,n))$, is determined for each pixel of the already-encoded small block, based on the global motion vector GMV (=(X, Y, Z)). Here, (m, n) indicates the position of each pixel in the small block.

The operation then shifts to step S6 where the representative motion vector is calculated based on the motion vector $v_{i-1}(m,n)$ determined in step S5 for each pixel of the already-encoded small block, and the calculated result is determined as the predicted vector $vp=(x_{vp}, y_{vp})$. Here, the representative motion vector is calculated based on the average of motion vectors $v_{i-1}(m,n)$ of each pixel.

$$x_{vp} = \frac{1}{M \cdot N} \sum_{n=1}^{N} \sum_{m=1}^{M} x_{i-1}(m,n) \quad (10)$$

$$y_{vp} = \frac{1}{M \cdot N} \sum_{n=1}^{N} \sum_{m=1}^{M} y_{i-1}(m,n) \quad (11)$$

The operation then shifts to step S7, and prediction errors $dx_i$ and $dy_i$ for each component of the motion vector are calculated based on the motion vector $v_i=(x_i, y_i)$ of the target small block and the predicted vector vp, by using the following equations.

$$dx_i = x_i - x_{vp} \quad (12)$$

$$dy_i = y_i - y_{vp} \quad (13)$$

If it is determined that the encoding mode of the already-encoded small block is the intraframe coding mode in step S2, then the predicted vector vp=(0, 0); thus the prediction errors $dx_i$ and $dy_i$ are determined as follows:

$$dx_i = x_i - 0 \quad (14)$$

$$dy_i = y_i - 0 \quad (15)$$

If it is determined that the motion-compensating mode of the already-encoded small block is the LMC in step S4, then the motion vector of the already-encoded small block $v_{i-1}=(x_{i-1}, y_{i-1})$ is determined as the predicted vector vp. Therefore, the prediction errors $dx_i$ and $dy_i$ are determined as follows:

$$dx_i = x_i - x_{i-1} \quad (16)$$

$$dy_i = y_i - y_{i-1} \quad (17)$$

The operation then shifts to step S8, where the prediction errors $dx_i$ and $dy_i$ calculated in step S7 are subjected to reversible encoding such as the Huffman encoding, and the motion-vector encoding operation is finished.

(1-2) Motion Vector Decoding Method

Hereinbelow, the method of decoding the motion vector which was encoded by the above-explained encoding method will be explained with reference to FIG. 2.

Figure 2:
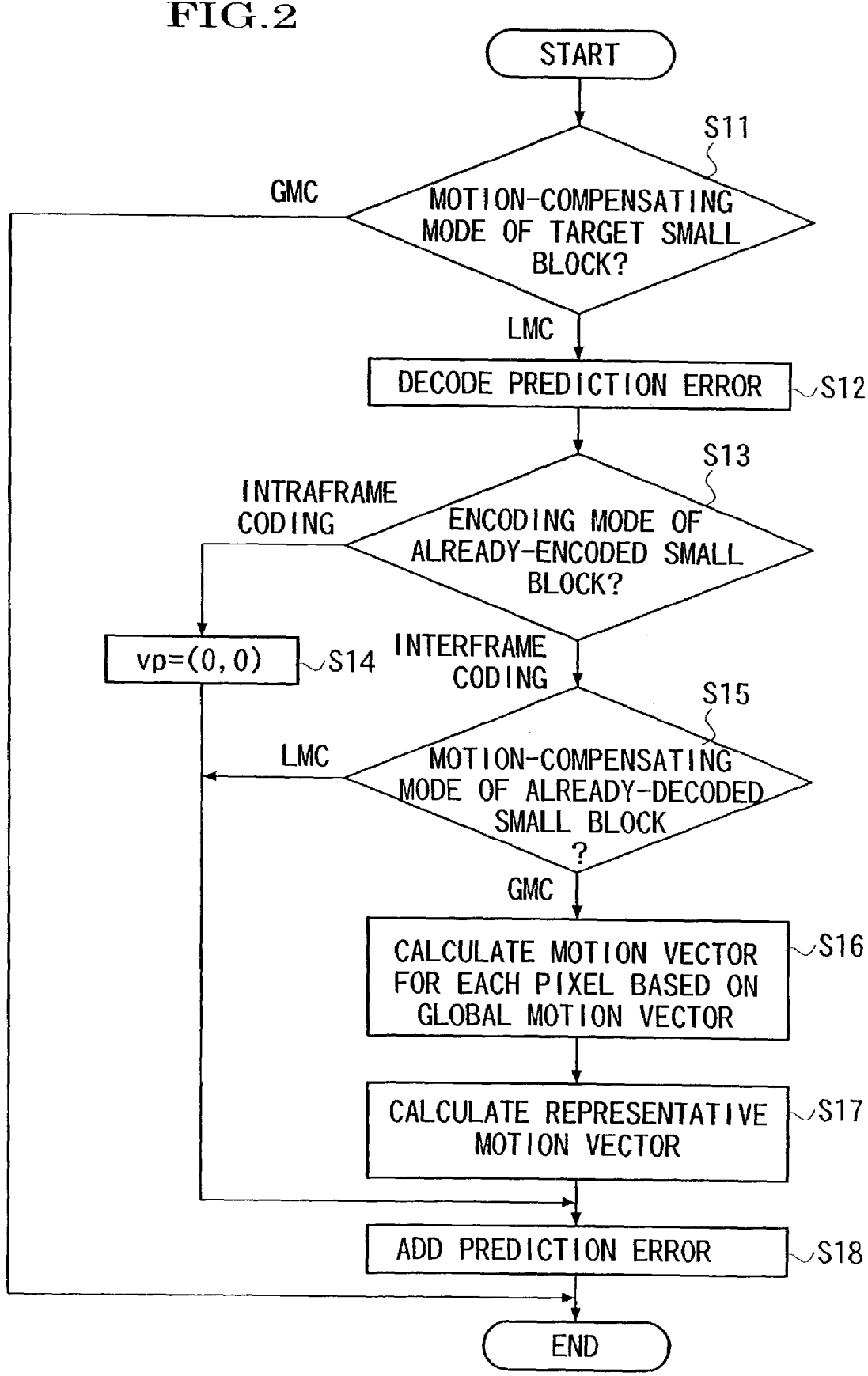
FIG. 2 is a flowchart showing the operations of the motion vector decoding method of the first embodiment according to the present invention.

In the first step S11 in FIG. 2, the motion-compensating mode of the target small block is determined. If the determined mode corresponds to the GMC, then it is determined that the predictive encoding of the motion vector was not executed, and the decoding operation is terminated.

If the mode corresponds to the LMC in step S11, then the operation shifts to step S12, where the prediction errors $dx_i$ and $dy_i$, which were reversibly encoded, are decoded. The operation then shifts to step S13, where the encoding mode of the already-decoded small block is determined. If it is determined that the encoding mode is the intraframe coding mode, then the prediction error vp is set to (0, 0) in step S14, and the operation shifts to step S18 (explained later).

If it is determined that the encoding mode is the interframe coding mode in step S13, then the operation shifts to step S15 where the motion-compensating mode of the already-decoded small block is determined. If it is determined that the motion-compensating mode of the already-decoded small block corresponds to the LMC, then the motion vector of the already-decoded small block $v_{i-1}=(x_{i-1}, y_{i-1})$ is determined as the predicted vector vp and the operation shifts to step S18.

If it is determined that the motion-compensating mode of the already-decoded small block corresponds to the GMC in step S15, then the operation shifts to step S16, where the motion vector of the translational motion model, that is, $v_{i-1}(m,n)=(x_{i-1}(m,n), y_{i-1}(m,n))$, is determined for each pixel of the already-decoded small block, based on the global motion vector GMV (=(X, Y, Z)). Here, (m, n) indicates the position of each pixel in the small block.

The operation then shifts to step S17 where the representative motion vector is calculated based on the motion vector $v_{i-1}(m,n)$ determined for each pixel of the already-decoded small block, and the calculated result is determined as the predicted vector $vp=(x_{vp}, y_{vp})$. Here, the representative motion vector is calculated based on the average of motion vectors $v_{i-1}(m,n)$ of each pixel.

$$x_{vp} = \frac{1}{M \cdot N} \sum_{n=1}^{N} \sum_{m=1}^{M} x_{i-1}(m,n) \quad (18)$$

$$y_{vp} = \frac{1}{M \cdot N} \sum_{n=1}^{N} \sum_{m=1}^{M} y_{i-1}(m,n) \quad (19)$$

The operation then shifts to step S18, where the components $x_{vp}$ and $y_{vp}$ of the predicted vector vp are respectively added to the prediction errors $dx_i$ and $dy_i$ so that the motion vector $v_i=(x_i, y_i)$ of the target small block is calculated as follows:

$$x_i = x_{vp} + dx_i \quad (20)$$

$$y_i = y_{vp} + dy_i \quad (21)$$

If it is determined that the encoding mode of the already-decoded small block is the intraframe coding mode in step S13, then the predicted vector vp=(0, 0) in step S14; thus the motion vector $v_i=(x_i, y_i)$ of the target small block is calculated as follows:

$$x_i = 0 + dx_i \quad (22)$$

$$y_i = 0 + dy_i \quad (23)$$

If it is determined that the motion-compensating mode of the already-decoded small block is the LMC in step S15, then the motion vector of the already-decoded small block $v_{i-1}=(x_{i-1}, y_{i-1})$ is determined as the predicted vector vp. Therefore, the motion vector $v_i=(x_i, y_i)$ of the target small block is calculated as follows:

$$x_i = x_{i-1} + dx_i \quad (24)$$

$$y_i = y_{i-1} + dy_i \quad (25)$$

When the process of step S18 is finished, the motion-vector decoding operation is also finished.

In step S6 in FIG. 1 and step S17 in FIG. 2 in the above embodiment, the representative motion vector is calculated using the average; however, the following statistics may be used. Here, a set of components $x_{i-1}(m,n)$ of the motion vector for each pixel is indicated by $X_{i-1}$, while a set of components $y_{i-1}(m,n)$ of the motion vector for each pixel is indicated by $Y_{i-1}$.

Maximum Value

The representative motion vector is calculated using the following equations.

$$x_{vp} = \max(X_{i-1}) \quad (26)$$

$$y_{vp} = \max(Y_{i-1}) \quad (27)$$

Minimum Value

The representative motion vector is calculated using the following equations.

$$x_{vp} = \min(X_{i-1}) \quad (28)$$

$$y_{vp} = \min(Y_{i-1}) \quad (29)$$

Intermediate Value

The representative motion vector is calculated using the following equations.

$$x_{vp} = (\max(X_{i-1}) + \min(X_{i-1}))/2 \quad (30)$$

$$y_{vp} = (\max(Y_{i-1}) + \min(Y_{i-1}))/2 \quad (31)$$

Mode

The frequency distribution is examined for each component of the motion vector, and the value corresponding to the maximum frequency is determined as the relevant component of the representative motion vector.

Median

First, each component of the motion vector is arranged in order of size:

$$xs_1 \leq xs_2 \leq \ldots \leq xs_{n-1} \leq xs_n \quad (32)$$

$$ys_1 \leq ys_2 \leq \ldots \leq ys_{n-1} \leq ys_n \quad (33)$$

where n means the number of pixels of the small block, xs and ys are respectively obtained by rearranging the components $X_{i-1}$ and $Y_{i-1}$ (of the motion vector for each pixel) in order of the size. The representative motion vector is calculated based on the above rearranged order of the components of the motion vector. That is:

When the number of pixels n is an odd number:

$$x_{vp} = xs_{(n+1)/2} \quad (34)$$

$$y_{vp} = ys_{(n+1)/2} \quad (35)$$

When the number of pixels n is an even number:

$$x_{vp} = (xs_{n/2} + xs_{n/2+1})/2 \quad (36)$$

$$y_{vp} = (ys_{n/2} + ys_{n/2+1})/2 \quad (37)$$

In the above embodiment, the motion vector of any small block which was encoded before the target small block was encoded, such as the motion vector of the small block which was encoded immediately before, can be used as the motion vector of the already-encoded small block. In addition, the predicted vector may be calculated using the motion vectors of a plurality of already-encoded small blocks.

(2) Motion Vector Predictive Encoding and Decoding Apparatuses

Hereinbelow, the motion vector predictive encoding and decoding apparatuses according to the above-explained motion vector encoding and decoding methods will be explained with reference to FIGS. 3 and 4.

(2-1) Motion Vector Predictive Encoding Apparatus

Figure 3:
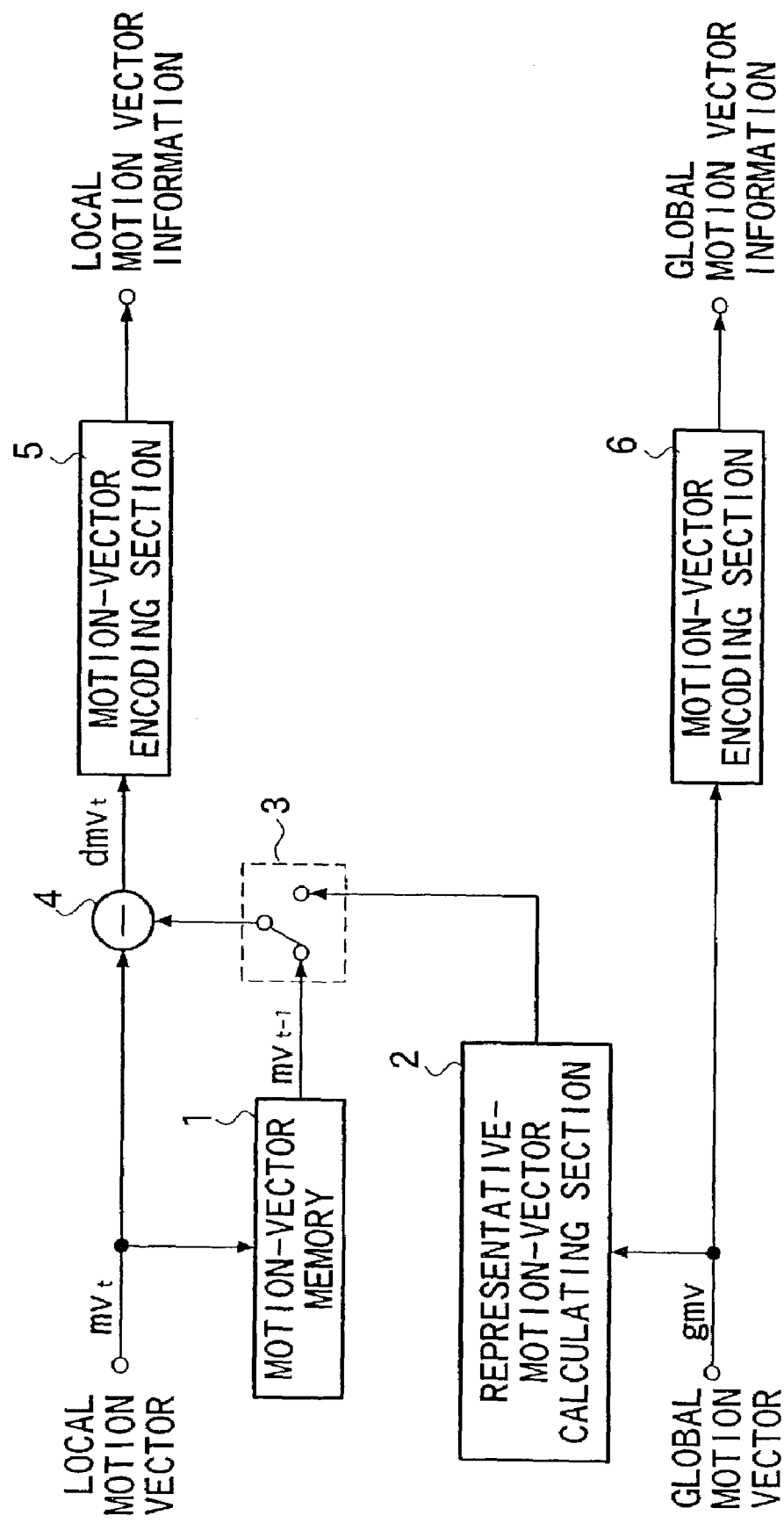
FIG. 3 is a block diagram showing the functional structure of the motion vector predictive encoding apparatus of the first embodiment according to the present invention.

FIG. 3 shows the functional structure of the motion vector encoding apparatus for performing the motion-vector encoding according to the above-explained motion vector encoding method. In this figure, the global motion vector is input once for a picture (plane), and the local motion vector is input only when the target small block is local-compensated.

The motion vector memory 1 stores the input local motion vector mv of the target small block. When the next local motion vector mv is input, the motion vector memory 1 outputs the stored local motion vector as motion vector $mv_{t-1}$ of the already-encoded small block.

The representative-motion-vector calculating section 2 has an internal memory. When the motion-compensating method applied to the input target small block is the LMC and the motion-compensating method applied to the already-encoded small block is the GMC, the calculating section 2 reads out the already-encoded global motion vector "gmv" from the internal memory, and calculates a representative motion vector for each small block based on the global motion vector gmv. The calculated result is output as the representative motion vector of the already-encoded small block when next local motion vector mv of the already-encoded small block is input.

Selector 3 operates in one of the following manners. In the first case, the selector 3 outputs motion vector $mv_{t-1}$ of the already-encoded small block output from the motion vector memory 1, or the representative motion vector output from the representative-motion-vector calculating section 2, according to the motion-compensating mode of the target small block, the encoding mode of the already-encoded small block, and the motion-compensating mode of the already-encoded small block. In the second case, the selector 3 outputs no motion vector, that is, neither of the two motion vectors is chosen (this state is called a "neutral state" hereinbelow).

Subtracter 4 subtracts the output from the selector 3 from the local motion vector $mv_t$ of the target small block, and outputs prediction error $dmv_t$. The motion-vector encoding section 5 executes the variable-length encoding of the prediction error $dmv_t$ which is output from the subtracter 4. The encoding section 5 outputs the encoded results as local motion vector information. The encoding section 6 executes the variable-length encoding of the global motion vector gmv, and outputs the encoded results as global motion vector information.

The operations of the encoding apparatus having the above-explained structure will be explained below. When a global motion vector is supplied from an external device, the supplied global motion vector gmv is input into both the representative-motion-vector calculating section 2 and the motion-vector encoding section 6. In the motion-vector encoding section 6, the input data is variable-length-encoded and then output to the outside. In the representative-motion-vector calculating section 2, the above global motion vector gmv is stored into the internal memory.

At this time, the local motion vector is not supplied from an external device, and the selector 3 detects that the supplied motion vector is the global motion vector and thus enters the neutral state. Accordingly, no local motion vector information is output from the motion-vector encoding section 5.

When local motion vector $mv_t$ is supplied from an external device after the above operations are executed, the supplied local motion vector $mv_t$ is input into motion vector memory 1 and subtracter 4. In this case, the motion-compensating method of the target block is the LMC and the motion-compensating method of the already-encoded small block is the GMC. Therefore, in the representative-motion-vector calculating section 2, motion vector "$v_{t-1}(m, n) = (x_{i-1}(m,n), y_{i-1}(m,n))$" of the translational motion model is calculated for each pixel of the already-encoded small block, based on the global motion vector gmv stored in the internal memory (this process corresponds to step S5 in FIG. 1). Here, m and n indicate the relevant position of the pixel in the small block.

In the representative-motion-vector calculating section 2, a representative motion vector is calculated from the calculated motion vector $v_{t-1}(m, n)$, and is output as the motion vector of the already-encoded small block (this process corresponds to step S6 in FIG. 1). Here, the representative motion vector is calculated based on the average of the motion vector $v_{t-1}(m, n)$ for each pixel.

The selector 3 determines the encoding mode of the already-encoded small block. If the mode is the intraframe coding mode, the selector is in the neutral state and no signal is output from the selector (this process corresponds to step S3 in FIG. 1). Therefore, the supplied local motion vector $mv_t$ passes through the subtracter 4 (this process corresponds to the operation using the above-described equations (14) and (15), performed in step S7 in FIG. 1), and the motion vector is variable-length-encoded in the motion-vector encoding section 5 (this process corresponds to step S8 in FIG. 1) and is output to the outside.

On the other hand, if selector 3 determines that the encoding mode of the already-encoded small block is the interframe coding mode, the motion-compensating mode of the already-encoded small block is then determined (this process corresponds to step S4 in FIG. 1). Here, the motion-compensating mode of the already-encoded small block is the GMC; thus, the selector 3 chooses the representative motion vector output from the representative-motion-vector calculating section 2, and outputs the vector into subtracter 4.

Accordingly, in the subtracter 4, the representative motion vector is subtracted from the target small block (this process corresponds to the operation using the above-described equations (12) and (13), performed in step S7 in FIG. 1), and the result of the subtraction is output as the prediction error $dmv_t$ into the motion-vector encoding section 5, where the prediction error is variable-length-encoded (this process corresponds to step S8 in FIG. 1) and is output to the outside.

If another local motion vector $mv_t$ is supplied from an external device after the above operations are executed, the supplied local motion vector $mv_t$ is input into motion vector memory 1 and subtracter 4. The motion vector memory 1 outputs the local motion vector $mv_{t-1}$ which was the previously-input vector.

The selector 3 determines the encoding mode of the already-encoded small block. If the mode is the intraframe coding mode, the selector 3 enters the neutral state and no signal is output from the selector (this process corresponds to step S3 in FIG. 1). Therefore, the supplied local motion vector $mv_t$ passes through the subtracter 4 (this process corresponds to the operation using the above-described equations (14) and (15), performed in step S7 in FIG. 1), and the motion vector is variable-length-encoded in the motion-vector encoding section 5 (this process corresponds to step S8 in FIG. 1) and is output to the outside.

On the other hand, if selector 3 determines that the encoding mode of the already-encoded small block is the interframe coding mode, the motion-compensating mode of the already-encoded small block is then determined (this process corresponds to step S4 in FIG. 1). Here, the motion-compensating mode of the already-encoded small block is the LMC; thus, the selector 3 chooses the local motion vector $mv_{t-1}$ of the already-encoded small block output from motion vector memory 1, and outputs the vector into subtracter 4.

Accordingly, in the subtracter 4, the already-encoded local motion vector $mv_{t-1}$ is subtracted from the motion vector $mv_t$ of the target small block (this process corresponds to the operation using the above-described equations (16) and (17), performed in step S7 in FIG. 1), and the result of subtraction is output as the prediction error $dmv_t$ into the motion-vector encoding section 5, where the prediction error is variable-length-encoded (this process corresponds to step S8 in FIG. 1) and is output to the outside.

(2-2) Motion Vector Decoding Apparatus

Figure 4:
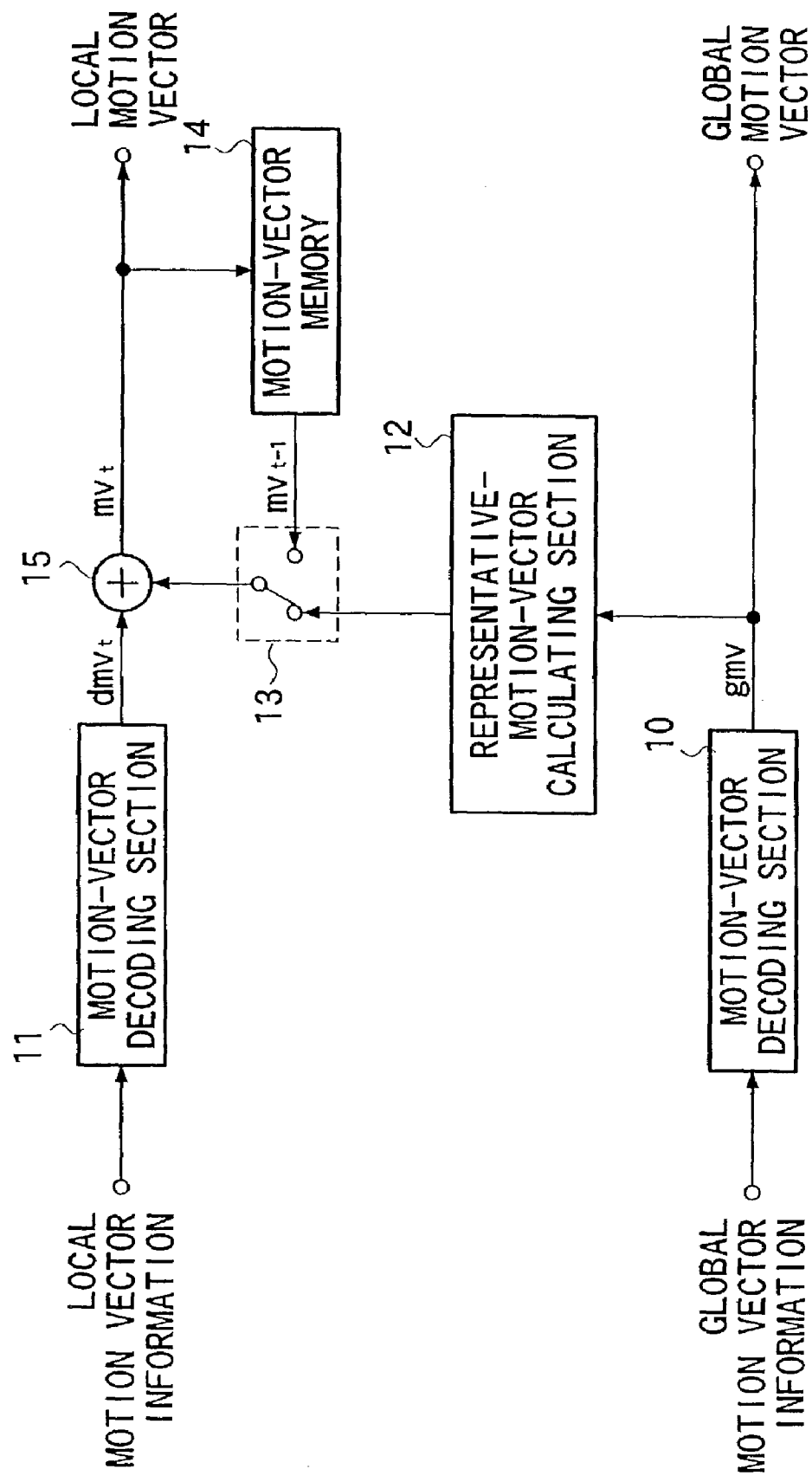
FIG. 4 is a block diagram showing the functional structure of the motion vector decoding apparatus of the first embodiment according to the present invention.

FIG. 4 shows the functional structure of the decoding apparatus for decoding the motion vector according to the above-explained motion vector decoding method. In this figure, motion-vector decoding section 10 decodes the global motion vector information which is output from the motion vector predictive encoding apparatus as shown in FIG. 3. The decoding section 10 outputs the decoded result as global motion vector gmv into representative-motion-vector calculating section 12 and the outside. The motion-vector decoding section 11 decodes the local motion vector information which was output from the motion vector predictive encoding apparatus as shown in FIG. 3. The decoding section 11 outputs the decoded result as the prediction error $dmv_t$ into adder 15.

The representative-motion-vector calculating section 12 has an internal memory. When the motion-compensating method applied to the input target small block is the LMC and the motion-compensating method applied to the already-decoded small block is the GMC, the calculating section 12 reads out the already-decoded global motion vector gmv from the internal memory, and calculates a representative motion vector for each small block based on the global motion vector gmv. The calculated result is output as the representative motion vector of the already-decoded small block when next the local motion vector information is decoded by the motion-vector decoding section 11 and the prediction error $dmv_t$ is output.

Selector 13 operates in one of the following manners. In the first case, the selector 13 outputs the representative motion vector output from the representative-motion-vector calculating section 12, or the motion vector $mv_{t-1}$ of the already-decoded small block output from the motion vector memory 14, according to the motion-compensating mode of the target small block, the encoding mode of the already-decoded small block, and the motion-compensating mode of the already-decoded small block. In the second case, the selector 13 enters the neutral state and outputs no motion vector.

Motion vector memory 14 stores the local motion vector mv of the already-encoded small block, which is output from the adder 15. When next the prediction error $dmv_t$ is output from the motion-vector decoding section 11, the stored local motion vector is output as the local motion vector $mv_{t-1}$ of the already-decoded small block. In addition, the adder 15 adds the output from selector 13 to the prediction error $dmv_t$ output from, the motion-vector decoding section 11, and outputs the added result as local motion vector $mv_t$ into motion vector memory 14 and the outside.

The operations of the motion vector decoding apparatus having the above-explained structure will be explained below. When global motion vector information is supplied from the motion vector predictive encoding apparatus as shown in FIG. 3, the supplied global motion vector information is decoded into global motion vector gmv by motion-vector decoding section 10, and is output into the representative-motion-vector calculating section 12 and the outside. Accordingly, the global motion vector gmv is stored into the internal memory in the representative-motion-vector calculating section 12.

In this phase, no local motion vector information is supplied from the motion vector predictive encoding apparatus as shown in FIG. 3, and the selector 13 recognizes that the supplied motion vector information is the global motion vector information and enters the neutral state. Therefore, local motion vector $mv_t$ is never output from adder 15.

When local motion vector information is supplied from the motion vector predictive encoding apparatus as shown in FIG. 3 after the above operations, the supplied local motion vector information is decoded into the prediction error $dmv_t$ in the motion-vector decoding section 11 (this process corresponds to step S12 in FIG. 2), and is output into adder 15. In this case, the motion-compensating method of the target small block is the LMC and the motion-compensating method of the already-decoded small block is the GMC; thus, in the representative-motion-vector calculating section 12, motion vector "$v_{t-1}(m, n)=(x_{t-1}(m,n), y_{t-1}(m,n))$" of the translational motion model is calculated for each pixel of the already-decoded small block, based on the global motion vector "gmv" stored in the internal memory (this process corresponds to step S16 in FIG. 2). Here, m and n indicate the relevant position of the pixel in the small block.

The representative motion vector is then calculated from the calculated motion vector $v_{t-1}(m, n)$, and is output as the motion vector of the already-decoded small block (this process corresponds to step S17 in FIG. 2). Here, the representative motion vector is calculated based on the average of the motion vector $v_{t-1}(m, n)$ for each pixel.

The selector 13 determines the encoding mode of the already-decoded small block. If the mode is the intraframe coding mode, the selector is in the neutral state and no signal is output from the selector (this process corresponds to step S14 in FIG. 2). Therefore, no element is added to the decoded prediction error $dmv_t$, and the prediction error is output as the local motion vector $mv_t$ into motion vector memory 14 and the outside (this process corresponds to the operation using the above-described equations (22) and (23), performed in step S18 in FIG. 2).

On the other hand, if selector 13 determines that the encoding mode of the already-decoded small block is the interframe coding mode, the motion-compensating mode of the already-decoded small block is then determined (this process corresponds to step S15 in FIG. 2). Here, the motion-compensating mode of the already-decoded small block is the GMC; thus, the selector 13 chooses the representative motion vector output from the representative-motion-vector calculating section 12, and outputs the vector into adder 15.

Accordingly, in the adder 15, the prediction error $dmv_t$ which was decoded in the motion-vector decoding section 11 and the representative motion vector are added to each other (this process corresponds to the operation using the above-described equations (20) and (21), performed in step S12 in FIG. 2), and the added result is output as the local motion vector $mv_t$ into the motion vector memory 14 and the outside.

If another local motion vector information is supplied from the motion vector predictive encoding apparatus as shown in FIG. 3 after the above operations are executed, the supplied local motion vector information is decoded into the prediction error $dmv_t$ in the motion-vector decoding section 11 and is output into adder 15. The selector 13 determines the encoding mode of the already-decoded small block again. If the mode is the intraframe coding mode, the selector 13 enters the neutral state and no signal is output from the selector (this process corresponds to step S14 in FIG. 2). Therefore, no element is added to the decoded prediction error $dmv_t$ in adder 15, and the prediction error is output as local motion vector $mv_t$ into motion vector memory 14 and the outside (this process corresponds to the operation using the above-described equations (22) and (23), performed in step S18 in FIG. 2).

On the other hand, if selector 13 determines that the encoding mode of the already-decoded small block is the interframe coding mode, then the motion-compensating mode of the already-decoded small block is determined (this process corresponds to step S15 in FIG. 2). Here, the motion-compensating mode of the already-decoded small block is the LMC; thus, the selector 13 chooses the local motion vector $mv_{t-1}$ of the already-decoded small block output from motion vector memory 14, and outputs the vector into adder 15.

Accordingly, in the adder 15, local motion vector $mv_{t-1}$ of the already-decoded small block, which was output from the motion vector memory 14, and the prediction error $mv_t$ are added to each other (this process corresponds to the operation using the above-described equations (24) and (25), performed in step 28 in FIG. 2), and the added result is output as local motion vector $mv_t$ into motion vector memory 14 and the outside.

As the representative motion vector calculated in each of the representative-motion-vector calculating sections 2 and 12 in the motion vector predictive encoding apparatus and motion vector decoding apparatus as shown in FIGS. 3 and 4, instead of the average of the motion vectors of each pixel of the already-decoded small block, a statistic such as the maximum value, the minimum value, the intermediate value, the mode, or the median may be used as described in the above items (1-1: encoding method) and (1-2: decoding method).

Second Embodiment (1) Motion Vector Predictive Encoding Method and Motion Vector Decoding Method Hereinbelow, the motion vector predictive encoding method and motion vector decoding method of the second embodiment according to the present invention will be explained. The present encoding and decoding methods differ from those of the first embodiment in an additional operation in which if the value of the predicted vector which is obtained based on the global motion parameters is not within the range of the local motion vector, the predicted vector is clipped into the minimum value or the maximum value of the range.

(1-1) Motion Vector Predictive Encoding Method

Figure 5:
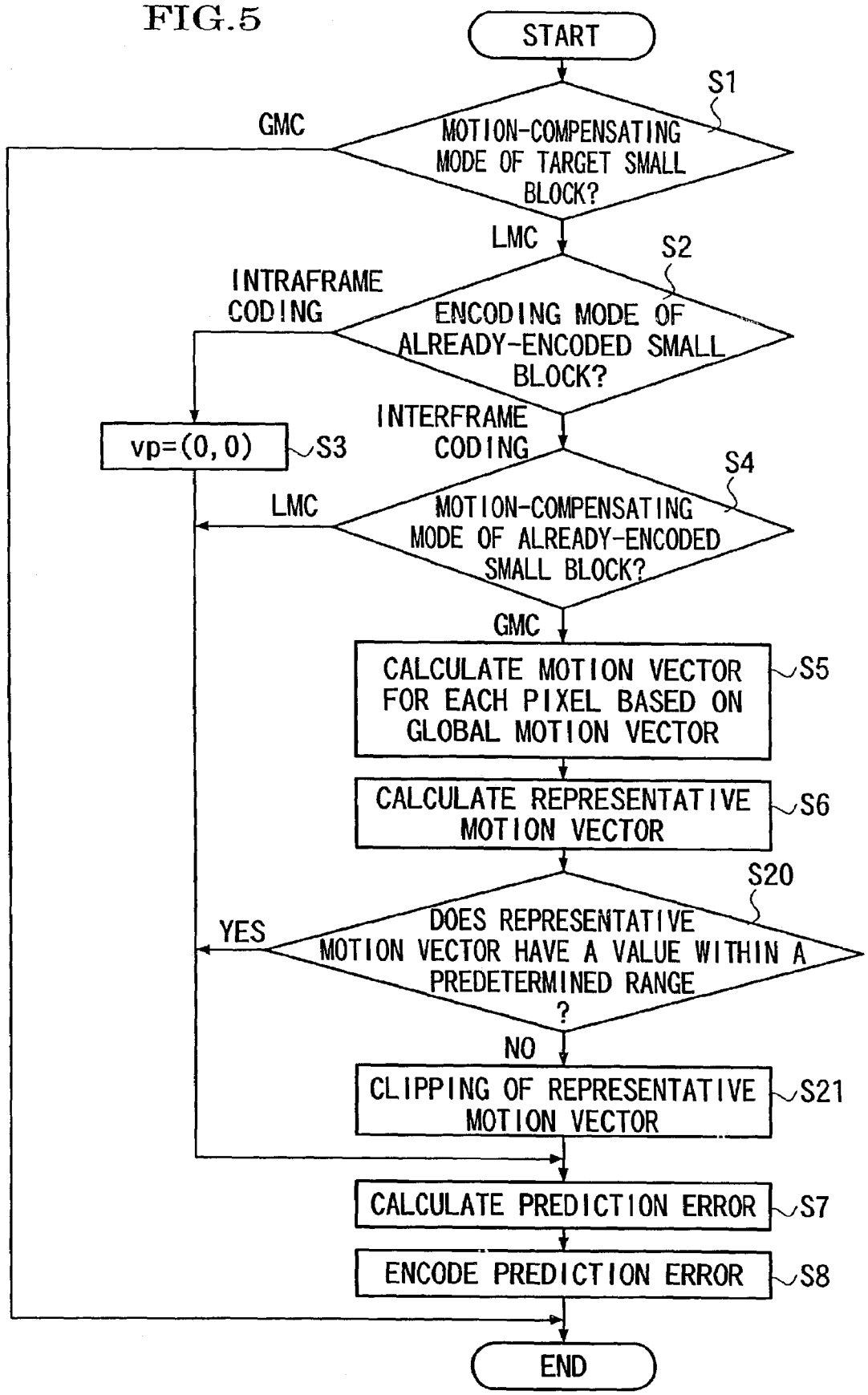
FIG. 5 is a flowchart showing the operations of the motion vector predictive encoding method of the second embodiment according to the present invention.

Hereinafter, the motion vector predictive encoding method of the second embodiment will be explained with reference to the flowchart in FIG. 5. FIG. 5 shows a flowchart explaining the motion vector predictive encoding method of the second embodiment. In this figure, steps identical to those in the operations of the motion vector predictive encoding method as shown in FIG. 1 are given identical reference numbers, and detailed explanations are omitted here.

The motion vector predictive encoding method as shown in FIG. 5 differs from that as shown in FIG. 1 in the point that after the representative motion vector is calculated in step S6, it is determined whether the value of the calculated representative motion vector is within a predetermined range, and if the value is not within the range, the clipping of the value of the representative motion vector is performed.

That is, as shown in the first embodiment, if (i) the motion-compensating mode of the target small block is determined as the LMC in step Si, (ii) the encoding mode of the already-encoded small block is determined as the interframe coding mode in step S2, and (iii) the motion-compensating mode of the already-encoded small block is determined as the GMC in step S4, then in step S5, the motion vector of the translational motion model is calculated for each pixel of the already-encoded small block, based on the global motion vector GMV.

In the next step S6, the average of the motion vectors (calculated in the above step S5) of each pixel of the already-encoded small block is calculated, and the calculated average is determined as the representative motion vector. As in the motion vector predictive encoding method in the first embodiment, the representative motion vector may be not only the average of the motion vectors of each pixel of the already-encoded small block, but also a statistic such as the maximum value, the minimum value, the intermediate value, the mode, or the median.

In the next step S20, it is determined whether the value of the representative motion vector calculated in step S6 is within a predetermined range. If the value is not within the range, the operation shifts to step S21 where the above representative motion vector is clipped so as to make the value thereof within this range.

Here, it is assumed that the possible range for representing the motion vector (for example, the range defined by the "fcode" in the MPEG-4 as shown in List 1) is from $MV_{min}$ to $MV_{max}$. If the value of the representative motion vector is less than $MV_{min}$, then the representative motion vector is clipped so as to have value $MV_{min}$. If the value of the representative motion vector exceeds $MV_{max}$, then the representative motion vector is clipped so as to have value $MV_{max}$. For example, if the motion vector range is from −64 to +63.5 in the case of "fcode=3" (refer to List 1) as defined in the MPEG-4, and the predicted vector vp determined based on the global motion parameters is $(x_{PV}, y_{PV})=(+102, +75)$, then these values are compulsively changed into (63.5, 63.5).

If it is determined in step S20 that the value of the representative motion vector is within the predetermined range, then the representative motion vector calculated in step S6 is determined as predicted vector vp.

The operation then shifts to step S7, where a difference between the motion vector of the target small block and the predicted vector (i.e., the prediction error) is calculated. In the MPEG-4, three blocks such as the left, immediately above, and right-and-diagonally-above blocks are referred to as shown in FIG. 13. Therefore, the processes of steps S2–S6, S20, S21, and S7 are performed for each block, and the median of the three candidate blocks is determined as the prediction error.

The operation then shifts to step S8 where the prediction error determined in step S7 is encoded, and the encoding operation of the second embodiment is finished.

(1-2) Motion Vector Decoding Method

Figure 6:
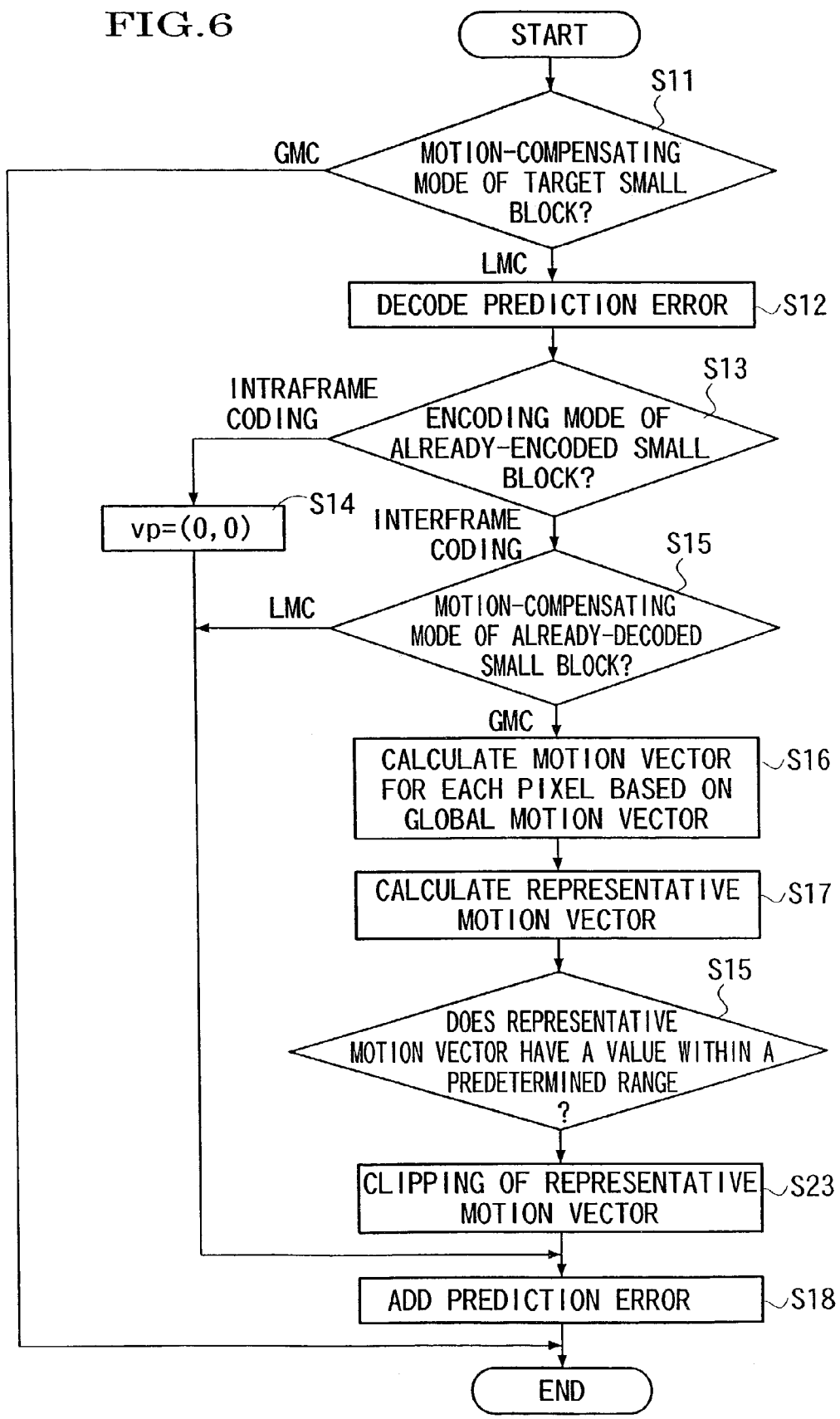
FIG. 6 is a flowchart showing the operations of the motion vector decoding method of the second embodiment according to the present invention.

Hereinbelow, the motion vector decoding method of the second embodiment will be explained with reference to the flowchart as shown in FIG. 6. FIG. 6 shows the flowchart explaining the motion vector decoding method of the second embodiment. In this figure, steps identical to those in the operations of the motion vector decoding method as shown in FIG. 2 are given identical reference numbers, and detailed explanations are omitted here.

The motion vector decoding method as shown in FIG. 6 differs from that as shown in FIG. 2 in the point that after the representative motion vector is calculated in step S27, it is determined whether the value of the calculated representative motion vector is within a predetermined range, and if the value is not within the range, the clipping of the value of the representative motion vector is performed.

That is, as shown in the first embodiment, if the motion-compensating mode of the target small block is determined as the LMC in step S11, then in step S12, the prediction error is decoded. If (i) the encoding mode of the already-decoded small block is determined as the interframe coding mode in step S13, and (ii) the motion-compensating mode of the already-decoded small block is the GMC, then in step S16, the motion vector of the translational motion model is calculated for each pixel of the already-decoded small block, based on the global motion vector GMV.

In the next step S17, the average of the motion vectors (calculated in the above step S16) of each pixel of the already-decoded small block is calculated, and the calculated average is determined as the representative motion vector. As in the motion vector decoding method in the first embodiment, the representative motion vector may be not only the average of the motion vectors of each pixel of the already-decoded small block, but also a statistic such as the maximum value, the minimum value, the intermediate value, the mode, or the median.

In the next step S22, it is determined whether the value of the representative motion vector calculated in step S17 is within a predetermined range. If the value is not within the range, the above representative motion vector is clipped so as to make the value thereof within the range.

Here, it is assumed that the possible range for representing the motion vector (for example, the range defined by the "fcode" in the MPEG-4 as shown in List 1) is from $MV_{min}$ to $MV_{max}$. If the value of the representative motion vector is less than $MV_{min}$, then the representative motion vector is clipped so as to have value $MV_{min}$. If the value of the representative motion vector exceeds $MV_{max}$, then the representative motion vector is clipped so as to have value $MV_{max}$. For example, if the motion vector range is from −64 to +63.5 in the case of "fcode=3" (refer to List 1) as defined in the MPEG-4, and the predicted vector vp determined based on the global motion parameters is $(x_{PV}, y_{PV})=(+102, +75)$, then these values are compulsively changed into (63.5, 63.5).

If it is determined in step S22 that the value of the representative motion vector is within the predetermined range, then the representative motion vector calculated in step S17 is determined as predicted vector vp.

The operation then shifts to step S18, where the prediction error of the target small block calculated in step S12 and the predicted vector are added. In the MPEG-4, three blocks such as the left, immediately above, and right-and-diagonally-above blocks are referred to as shown in FIG. 13. Therefore, the processes of steps S12–S17, S22, S23, and S18 are performed for each block, and the median of the three candidate blocks is determined as the predicted vector. The decoding operation of the second embodiment is then finished.

In the above-described motion vector predictive encoding method and motion vector decoding method, the clipping operation performed in step S21 (see FIG. 5) and step S23 (see FIG. 6) uses the maximum or minimum value of a predetermined range; however, the clipping may be performed at value 0.

Here, it is assumed that the possible range for representing the motion vector is from $MV_{min}$ to $MV_{max}$. If the value of the representative motion vector is less than $MV_{min}$, then the representative motion vector is clipped so as to have value 0. If the value of the representative motion vector exceeds $MV_{max}$, then the representative motion vector is also clipped so as to have value 0. For example, if the motion vector range is from −64 to +63.5 in the case of "fcode=3" (refer to List 1) as defined in the MPEG-4, and the predicted vector vp determined based on the global motion parameters is $(x_{PV}, y_{PV})=(+102, +75)$, then these values are compulsively changed into (0, 0).

Figure 7:
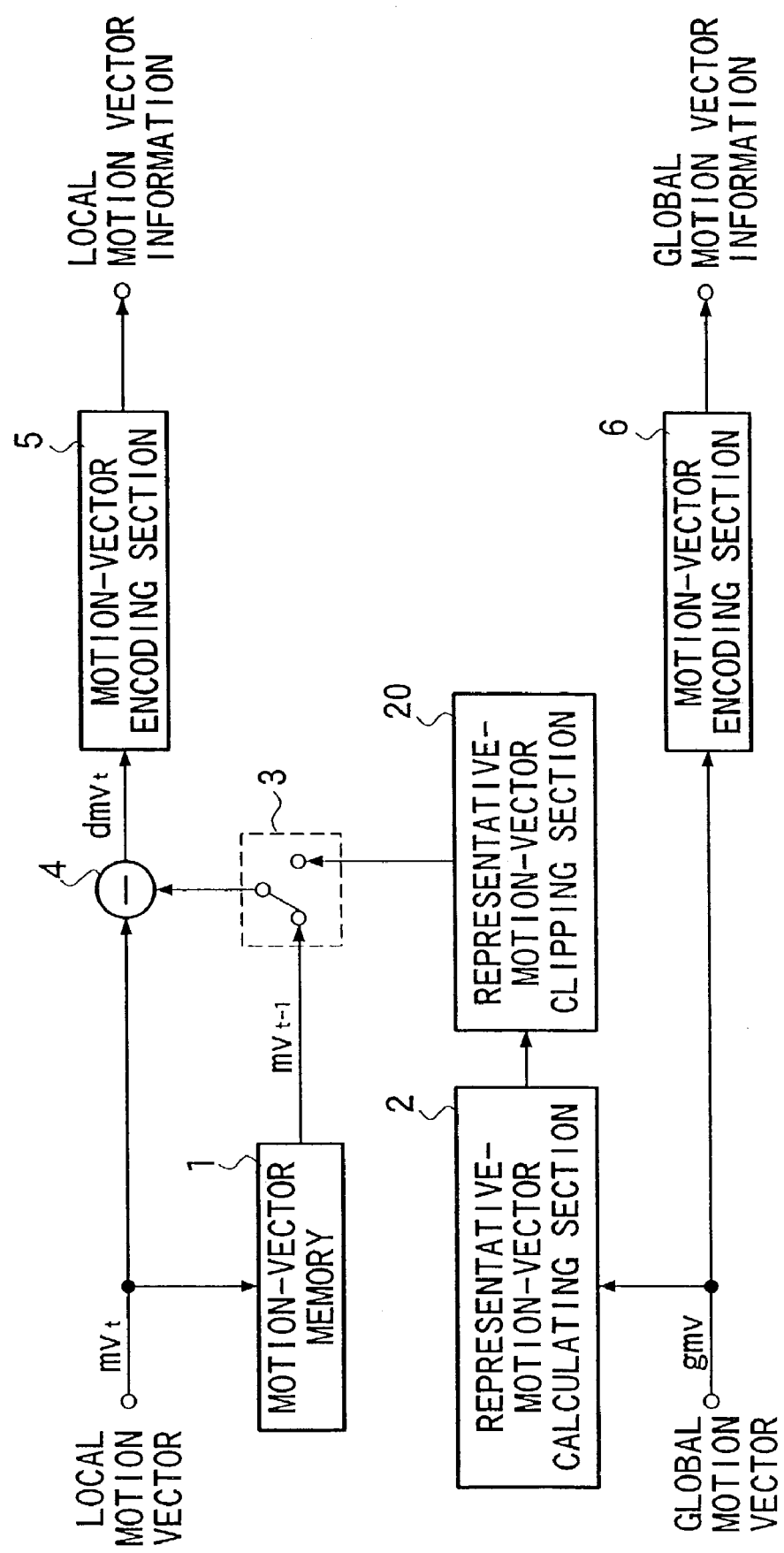
FIG. 7 is a block diagram showing the functional structure of the motion vector predictive encoding apparatus of the second embodiment according to the present invention.

(2) Motion Vector Predictive Encoding Apparatus and Decoding Apparatus (2-1) Motion Vector Predictive Encoding Apparatus The motion vector predictive encoding apparatus for performing the motion-vector predictive encoding according to the motion vector predictive encoding method (refer to FIG. 5) of the second embodiment will be explained with reference to FIG. 7. In FIG. 7, parts identical to those of the motion vector predictive encoding apparatus shown in FIG. 3 are given identical reference numbers, and explanations thereof are omitted here.

The motion vector predictive encoding apparatus shown in FIG. 7 differs from that in FIG. 3 in the point that representative-motion-vector clipping section 20 is provided between representative-motion-vector calculating section 2 and one of the input terminals of selector 3. The representative-motion-vector clipping section 20 determines whether the value of the representative motion vector output from the representative-motion-vector calculating section 2 is within a predetermined range. If the value is not within the range, the clipping section 20 clips the value of the representative motion vector to the maximum or minimum value of the range.

According to the motion vector predictive encoding apparatus having the above-explained structure, when a representative motion vector is calculated and output from the representative-motion-vector calculating section 2, that is, when processes corresponding to steps S5 and S6 in FIGS. 1 and 5 are performed in the representative-motion-vector calculating section 2, then in the representative-motion-vector clipping section 20, it is determined whether the value of the representative motion vector calculated in the representative-motion-vector calculating section 2 is within a predetermined range (this process corresponds to step S20 in FIG. 5).

If the value of the representative motion vector is not within the predetermined range, the representative motion vector is clipped so as to have a value within this range (this process corresponds to step S21 in FIG. 5), and the representative motion vector after the clipping is output into the selector 3. If the value of the representative motion vector is within the predetermined range, the original representative motion vector calculated in the representative-motion-vector calculating section 2 is output into the selector 3.

Here, it is assumed that the possible range for representing the motion vector (for example, the range defined by the "fcode" in the MPEG-4 as shown in List 1) is from $MV_{min}$ to $MV_{max}$. If the value of the representative motion vector is less than $MV_{min}$, then the representative motion vector is clipped so as to have value $MV_{min}$. If the value of the representative motion vector exceeds $MV_{max}$, then the representative motion vector is clipped so as to have value $MV_{max}$. For example, if the motion vector range is from −64 to +63.5 in the case of "fcode=3" (refer to List 1) as defined in the MPEG-4, and the predicted vector vp determined based on the global motion parameters is $(x_{PV}, y_{PV})$=(+102, +75), then these values are compulsively changed into (63.5, 63.5).

The clipping operation performed in the representative-motion-vector clipping section 20 uses the maximum or minimum value of a predetermined range; however, the clipping may be performed at value 0.

Here, it is assumed that the possible range for representing the motion vector is from $MV_{min}$ to $MV_{max}$. If the value of the representative motion vector is less than $MV_{min}$, then the representative motion vector is clipped so as to have value 0. If the value of the representative motion vector exceeds $MV_{max}$, then the representative motion vector is also clipped so as to have value 0. For example, if the motion vector range is from −64 to +63.5 in the case of "fcode=3" (refer to List 1) as defined in the MPEG-4, and the predicted vector vp determined based on the global motion parameters is $(x_{PV}, y_{PV})$=(+102, +75), then these values are compulsively changed into (0, 0).

Accordingly, the motion vector predictive encoding apparatus for performing the motion-vector predictive encoding according to the motion vector predictive encoding method as shown in the flowchart of FIG. 5 can be realized.

(2-2) Motion Vector Decoding Apparatus

Figure 8:
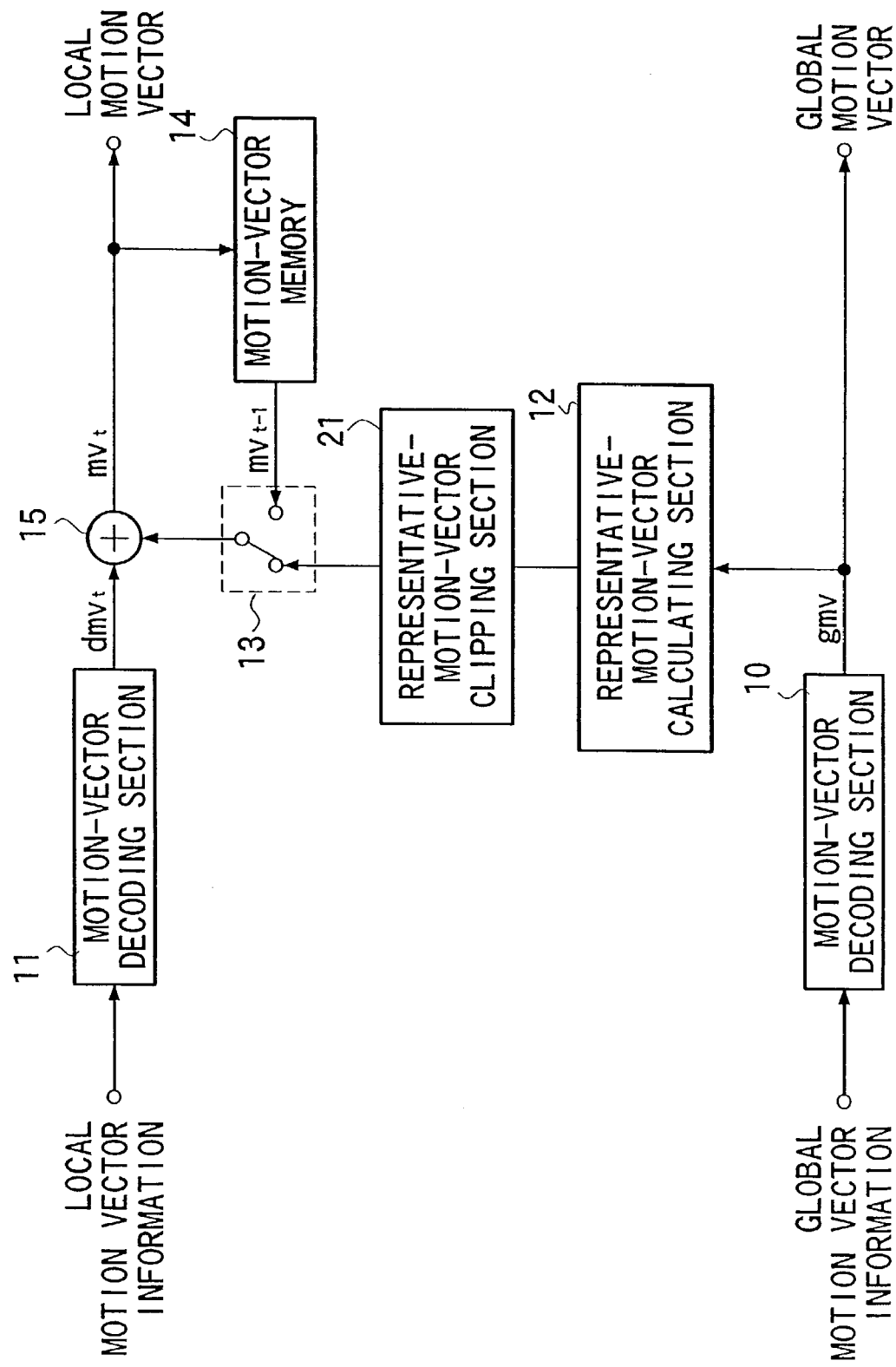
FIG. 8 is a block diagram showing the functional structure of the motion vector decoding apparatus of the second embodiment according to the present invention.
Figure 11:
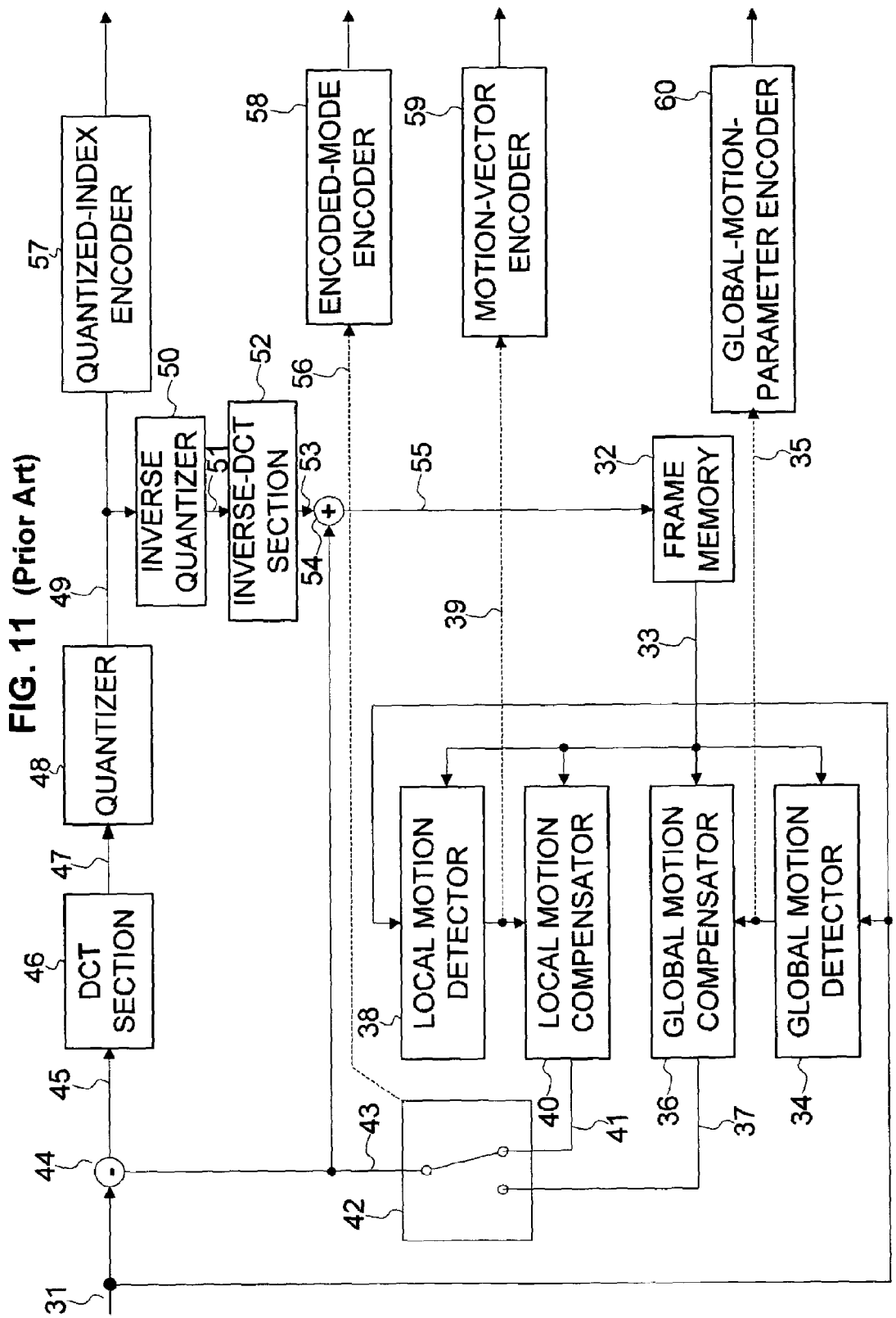
FIG. 11 is a diagram showing the structure of an example of the encoder for encoding moving pictures (the MPEG-4 encoder).
Figure 12:
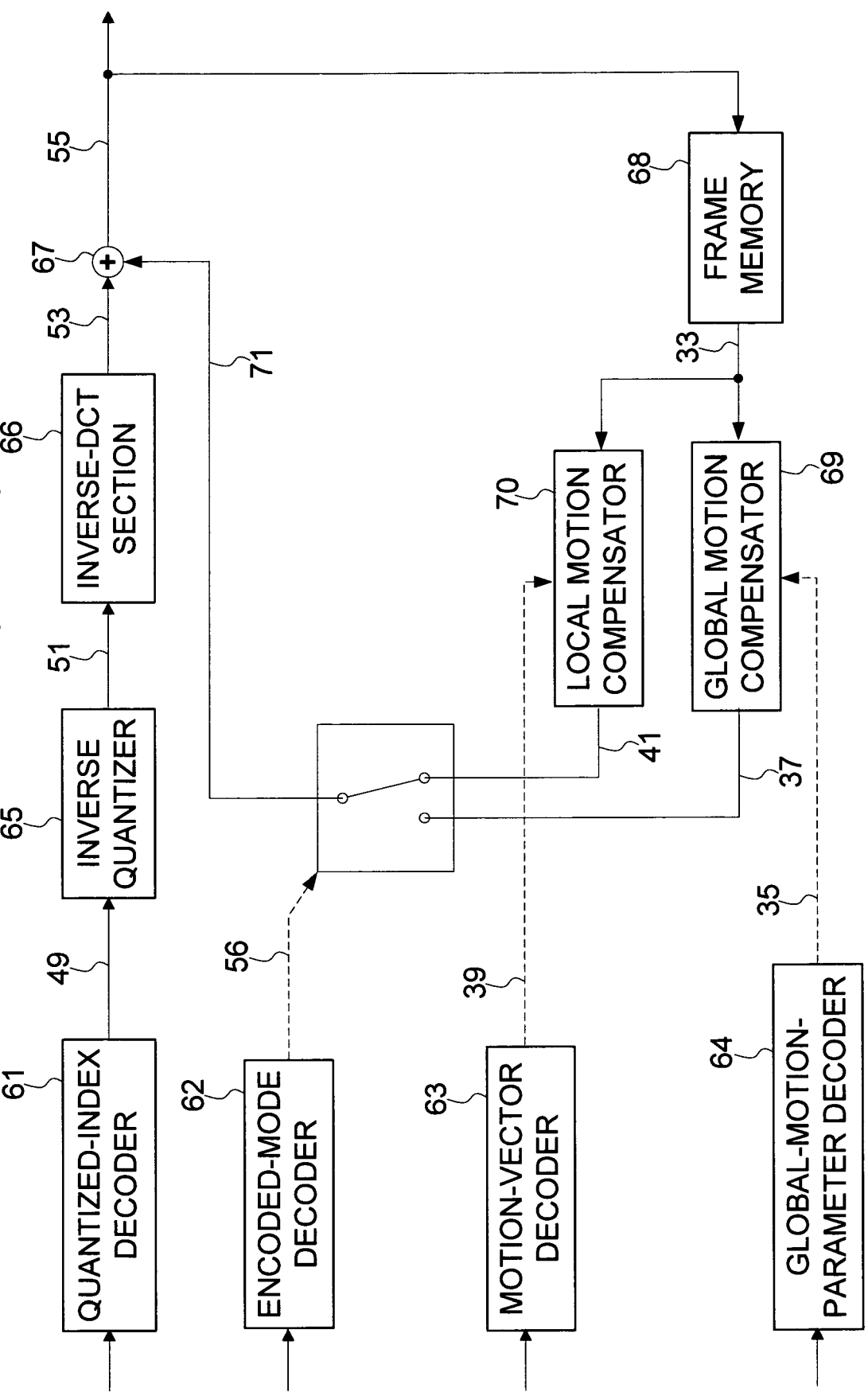
FIG. 12 is a diagram showing the structure of the decoder corresponding to the encoder in FIG. 11 (the MPEG-4 decoder).

The motion vector decoding apparatus for performing the motion-vector decoding according to the motion vector decoding method (refer to FIG. 6) of the second embodiment will be explained with reference to FIG. 8. In FIG. 8, parts identical to those of the motion vector decoding apparatus shown in FIG. 4 are given identical reference numbers, and explanations thereof are omitted here.

The motion vector decoding apparatus shown in FIG. 8 differs from that in FIG. 4 in the point that representative-motion-vector clipping section 21 is provided between representative-motion-vector calculating section 12 and one of the input terminals of selector 13. The representative-motion-vector clipping section 21 determines whether the value of the representative motion vector output from the representative-motion-vector calculating section 12 is within a predetermined range. If the value is not within the range, the clipping section 21 clips the value of the representative motion vector to the maximum or minimum value of the range.

According to the motion vector decoding apparatus having the above-explained structure, when a representative motion vector is calculated and output from the representative-motion-vector calculating section 12, that is, when processes corresponding to steps S16 and S17 in FIGS. 2 and 6 are performed in the representative-motion-vector calculating section 12, then in the representative-motion-vector clipping section 21, it is determined whether the value of the representative motion vector calculated in the representative-motion-vector calculating section 12 is within a predetermined range (this process corresponds to step S22 in FIG. 6).

If the value of the representative motion vector is not within the predetermined range, the representative motion vector is clipped so as to have a value within this range (this process corresponds to step S22 in FIG. 6), and the representative motion vector after the clipping is output into the selector 13. If the value of the representative motion vector is within the predetermined range, the original representative motion vector calculated in the representative-motion-vector calculating section 12 is output into the selector 13.

Here, it is assumed that the possible range for representing the motion vector (for example, the range defined by the "fcode" in the MPEG-4 as shown in List 1) is from $MV_{min}$ to $MV_{max}$. If the value of the representative motion vector is less than $MV_{min}$, then the representative motion vector is clipped so as to have value $MV_{min}$. If the value of the representative motion vector exceeds $MV_{max}$, then the representative motion vector is clipped so as to have value $MV_{max}$. For example, if the motion vector range is from −64 to +63.5 in the case of "fcode=3" (refer to List 1) as defined in the MPEG-4, and the predicted vector vp determined based on the global motion parameters is $(x_{PV}, y_{PV})$=(+102, +75), then these values are compulsively changed into (63.5, 63.5).

The clipping operation performed in the representative-motion-vector clipping section 21 uses the maximum or minimum value of a predetermined range; however, the clipping may be performed at value 0.

Here, it is assumed that the possible range for representing the motion vector is from $MV_{min}$ to $MV_{max}$. If the value of the representative motion vector is less than $MV_{min}$, then the representative motion vector is clipped so as to have value 0. If the value of the representative motion vector exceeds $MV_{max}$, then the representative motion vector is also clipped so as to have value 0. For example, if the motion vector range is from −64 to +63.5 in the case of "fcode=3" (refer to List 1) as defined in the MPEG-4, and the predicted vector vp determined based on the global motion parameters is $(x_{PV}, y_{PV})$=(+102, +75), then these values are compulsively changed into (0, 0).

Accordingly, the motion vector decoding apparatus for performing the motion-vector decoding according to the motion vector decoding method as shown in the flowchart of FIG. 6 can be realized.

In the above first and second embodiments, programs for executing the following operations may be stored in a computer-readable storage medium such as a CD-ROM or a floppy disk, and each program stored in the storage medium may be loaded and executed by a computer so as to perform the motion vector predictive encoding: the motion-vector predictive encoding operations as shown in the flowcharts of FIG. 1 and FIG. 5, and operations of motion vector memory 1, representative-motion-vector calculating section 2, selector 3, subtracter 4, motion-vector encoding sections 5 and 6 in the block diagram of FIG. 3, and representative-motion-vector clipping section 20 in the block diagram of FIG. 7.

Similarly, in order to perform the motion vector decoding, programs for executing the following operations may be stored in a computer-readable storage medium such as a CD-ROM or a floppy disk, and each program stored in the storage medium may be loaded and executed by a computer: the motion-vector decoding operations as shown in the flowcharts of FIG. 2 and FIG. 6, and operations of motion-vector decoding sections 10 and 11, representative-motion-vector calculating section 12, selector 13, motion vector memory 14, adder 15, and representative-motion-vector clipping section 21 in the block diagram of FIG. 8.

The present invention is not limited to the above-described embodiments, but various variations and applications are possible in the scope of the claimed invention.

The invention claimed is:

1. A motion vector predictive encoding method for encoding a target block of a frame, the method comprising:
   determining a motion compensation mode of the target block;

determining the motion compensation mode of an already-encoded block;

calculating a representative motion vector from a global motion vector of the already-encoded block, if the motion compensation mode of the already encoded block is a global motion compensation mode;

clipping the representative motion vector to a boundary of a predetermined range if the representative motion vector is outside the predetermined range;

predicting the motion vector of the target block based on the representative motion vector of an already-encoded block;

calculating a prediction error based on the predicted motion vector and the motion vector of the target block; and encoding the prediction error of the motion vector.

2. A motion vector decoding method for decoding a motion vector which was encoded using the motion vector predictive encoding method as claimed in claim 1, wherein if the motion model of the motion vector of a target small block to be decoded differs from the motion model of the motion vector of the already-decoded small block, then the motion vector of the already-decoded small block is converted into one suitable for the motion model of the motion vector used in the motion-compensating method of the target small block, and a predicted vector with respect to the motion vector of the target small block is calculated, and the motion vector is decoded by adding the prediction error to the predicted vector.

3. A motion vector decoding method as claimed in claim 2, wherein when the motion vector of the small block in any motion model is converted into a motion vector in another motion model having fewer parameters with respect to the motion vector than parameters of the above motion model, a representative motion vector of the small block is calculated based on the motion vector in the other motion model determined for each pixel in the small block.

4. A motion vector decoding method as claimed in claim 2, wherein when the motion vector of the small block in any motion model is converted into a motion vector in a translational motion model, a representative motion vector of the small block is calculated based on the motion vector in the translational motion model determined for each pixel in the small block.

5. A motion vector decoding method as claimed in claim 4, wherein in the calculation of the representative motion vector, each component of the representative motion vector is set to one of the average, intermediate value, median, mode, maximum value, and minimum value, which is calculated for each component of the motion vector in the translational motion model of each pixel in the small block.

6. A motion vector predictive encoding method as claimed in claim 1, wherein when the motion vector of the small block in any motion model is converted into a motion vector in another motion model having fewer parameters with respect to the motion vector than parameters of the above motion model, a representative motion vector of the small block is calculated based on the motion vector in the other motion model determined for each pixel in the small block.

7. A motion vector predictive encoding method as claimed in claim 1, wherein when the motion vector of the small block in any motion model is converted into a motion vector in a translational motion model, a representative motion vector of the small block is calculated based on the motion vector in the translational motion model determined for each pixel in the small block.

8. A motion vector predictive encoding method as claimed in claim 7, wherein in the calculation of the representative motion vector, each component of the representative motion vector is set to one of the average, intermediate value, median, mode, maximum value, and minimum value, which is calculated for each component of the motion vector in the translational motion model of each pixel in the small block.

9. A motion vector predictive encoding method in which interframe prediction is performed using one of a global motion-compensating method for predicting a global motion or deformation of an entire frame and a local motion-compensating method for predicting a local motion for each block, the encoding method comprising the steps of:

determining the motion-compensating mode used for a target small block to be encoded;

determining the encoding mode of an already-encoded small block if the motion-compensating mode of the target small block is the local motion compensation;

setting the value of the motion vector of the already-encoded small block to 0 if the encoding mode of the already-encoded small block is the intraframe coding;

determining the motion-compensating mode of the already-encoded small block if the encoding mode of the already-encoded small block is the interframe coding;

calculating a motion vector for each pixel of the already-encoded small block based on global motion parameters if the motion-compensating mode of the already-encoded small block is the global motion compensation;

calculating a representative motion vector of the already-encoded small block by using a predetermined method based on the motion vector determined for each pixel;

determining whether the value of the representative motion vector is within a predetermined range;

clipping the representative motion vector to have a value within the predetermined range or setting the value of the representative motion vector to 0 if the value of the representative motion vector is not within a predetermined range;

calculating a prediction error which is a difference between the motion vector of the already-encoded small block and the motion vector of the target block; and encoding the calculated prediction error.

10. A motion vector decoding method corresponding to the motion vector predictive encoding method as claimed in claim 9, the decoding method comprising the steps of:

determining the motion-compensating mode used for the target small block to be decoded;

decoding the prediction error of the motion vector if the motion-compensating mode of the target small block is the local motion compensation;

determining the encoding mode of the already-decoded small block;

setting the value of the motion vector of the already-decoded small block to 0 if the encoding mode of the already-decoded small block is the intraframe coding;

determining the motion-compensating mode of the already-decoded small block if the encoding mode of the already-decoded small block is the interframe coding;

calculating a motion vector for each pixel of a reference block based on global motion parameters if the motion-compensating mode of the already-decoded small block is the global motion compensation;

calculating a representative motion vector of the block by using a predetermined method, based on the motion vector determined for each pixel;

determining whether the value of the representative motion vector is within a predetermined range;

clipping the representative motion vector to have a value within the predetermined range or setting the value of the representative motion vector to 0 if the value of the representative motion vector is not within a predetermined range; and adding the decoded prediction error of the target block to the predicted vector.

11. A computer-readable storage medium encoded with a motion encoding computer program in which, when executed by the computer, interframe prediction is performed using one of a global motion-compensating method for predicting a global motion or deformation of an entire frame and a local motion-compensating method for predicting a local motion for each block, the program including the steps of: determining the motion-compensating mode used for a target small block to be encoded; determining the encoding mode of an already-encoded small block if the motion-compensating mode of the target small block is the local motion compensation; setting the value of the motion vector of the already-encoded small block to 0 if the encoding mode of the already-encoded small block is the intraframe coding; determining the motion-compensating mode of the already-encoded small block if the encoding mode of the already-encoded small block is the interframe coding; calculating a motion vector for each pixel of the already-encoded small block based on global motion parameters if the motion-compensating mode of the already-encoded small block is the global motion compensation; calculating a representative motion vector of the already-encoded small block by using a predetermined method, based on the motion vector determined for each pixel; determining whether the value of the representative motion vector is within a predetermined range; clipping the representative motion vector to have a value within the predetermined range or setting the value of the representative motion vector to 0 if the value of the representative motion vector is not within a predetermined range; calculating a prediction error which is a difference between the motion vector of the already-encoded small block and a predicted vector; and encoding the calculated prediction error.

12. A computer-readable storage medium storing a motion vector decoding program for decoding the motion vector which was encoded by executing the motion vector predictive encoding program as claimed in claim 11, the decoding program including the steps of: determining the motion-compensating mode used for the target small block to be decoded; decoding the prediction error of the motion vector if the motion-compensating mode of the target small block is the local motion compensation; determining the encoding mode of the already-decoded small block; setting the value of the motion vector of the already-decoded small block to 0 if the encoding mode of the already-decoded small block is the intraframe coding; determining the motion-compensating mode of the already-decoded small block if the encoding mode of the already-decoded small block is the interframe coding; calculating a motion vector for each pixel of a reference block based on global motion parameters if the motion-compensating mode of the already-decoded small block is the global motion compensation; calculating a representative motion vector of the block by using a predetermined method, based on the motion vector determined for each pixel; determining whether the value of the representative motion vector is within a predetermined range; clipping the representative motion vector to have a value within the predetermined range or setting the value of the representative motion vector to 0 if the value of the representative motion vector is not within a predetermined range; and adding the prediction error of the already-decoded small block to the predicted vector.

* * * * *